US011717798B2

(12) United States Patent
Liu et al.

(10) Patent No.: US 11,717,798 B2
(45) Date of Patent: Aug. 8, 2023

(54) FOOD PROCESSOR

(71) Applicant: GUANGDONG MIDEA CONSUMER ELECTRIC MANUFACTURING CO., LTD., Foshan (CN)

(72) Inventors: Yunxiang Liu, Foshan (CN); Baogang Li, Foshan (CN); Hai Yang, Foshan (CN); Jianfei Xu, Foshan (CN); Han Han, Foshan (CN)

( * ) Notice: Subject to any disclaimer, the term of this patent is extended or adjusted under 35 U.S.C. 154(b) by 274 days.

(21) Appl. No.: 16/763,954

(22) PCT Filed: Aug. 7, 2018

(86) PCT No.: PCT/CN2018/099073
§ 371 (c)(1),
(2) Date: May 13, 2020

(87) PCT Pub. No.: WO2019/095732
PCT Pub. Date: May 23, 2019

(65) Prior Publication Data
US 2020/0282372 A1    Sep. 10, 2020

(30) Foreign Application Priority Data
Nov. 14, 2017 (CN) .......................... 201711128043.8
Nov. 14, 2017 (CN) .......................... 201711128044.2
(Continued)

(51) Int. Cl.
A47J 43/046         (2006.01)
B01F 33/70          (2022.01)
(Continued)

(52) U.S. Cl.
CPC ............... *B01F 35/45* (2022.01); *A47J 19/00* (2013.01); *A47J 43/046* (2013.01);
(Continued)

(58) Field of Classification Search
CPC .......... A47J 19/00; A47J 36/06; A47J 43/046; A47J 43/0716; A47J 43/0772;
(Continued)

(56) References Cited

U.S. PATENT DOCUMENTS 2,941,908 A *  6/1960  Logan .................... B01J 19/10
                                              134/40
8,534,906 B2 *  9/2013  Harada .............. B01D 19/0026
                                              366/217
(Continued)

FOREIGN PATENT DOCUMENTS

CN        102631153 A      8/2012
CN        202589335 U     12/2012
(Continued)

OTHER PUBLICATIONS

Li X, Translated Patent Application of CN106308575A (Year: 2017).*
(Continued)

*Primary Examiner* — David L Sorkin
(74) *Attorney, Agent, or Firm* — Kilpatrick Townsend & Stockton, LLP

(57) ABSTRACT

The present disclosure provides a food processor, including: a cup body; a cup cover detachably connected to an upper end of the cup body, the cup cover including a pumping opening communicating with an inner cavity of the cup body, and being provided with a cover handle; and a vacuum pumping device detachably connected to the cup cover, the vacuum pumping device including a pumping hole and an exhaust hole, the pumping hole being configured to communicate with the pumping opening after the vacuum pumping device is mounted on the cup cover. The food processor has a simplified vacuum pumping structure, improving the use convenience of the food processor.

21 Claims, 21 Drawing Sheets

(30) Foreign Application Priority Data

| Nov. 14, 2017 | (CN) | 201711133340.1 |
| --- | --- | --- |
| Nov. 14, 2017 | (CN) | 201711133496.X |
| Nov. 14, 2017 | (CN) | 201711133497.4 |
| Nov. 14, 2017 | (CN) | 201711133498.9 |
| Nov. 14, 2017 | (CN) | 201711133641.4 |
| Nov. 14, 2017 | (CN) | 201711142527.6 |
| Nov. 14, 2017 | (CN) | 201721521043.X |
| Nov. 14, 2017 | (CN) | 201721521045.9 |
| Nov. 14, 2017 | (CN) | 201721526104.1 |
| Nov. 14, 2017 | (CN) | 201721526648.8 |
| Nov. 14, 2017 | (CN) | 201721526826.7 |
| Nov. 14, 2017 | (CN) | 201721526830.3 |
| Nov. 14, 2017 | (CN) | 201721527003.6 |
| Nov. 14, 2017 | (CN) | 201721527104.3 |
| Nov. 14, 2017 | (CN) | 201721527130.6 |
| Nov. 14, 2017 | (CN) | 201721536331.2 |
| Nov. 17, 2017 | (CN) | 201711133499.3 |
| Nov. 17, 2017 | (CN) | 201711133500.2 |

(51) Int. Cl.
  *B01F 35/45* (2022.01)
  *A47J 19/00* (2006.01)
  *A47J 43/07* (2006.01)
  *B01F 101/06* (2022.01)

(52) U.S. Cl.
  CPC ........... *A47J 43/0772* (2013.01); *B01F 33/70* (2022.01); *B01F 2101/06* (2022.01)

(58) Field of Classification Search
  CPC .. B01F 2101/06; B01F 35/45; B01F 35/6052; B01F 35/7176; B01F 33/70
  USPC ............ 366/139, 191–193, 205, 347
  See application file for complete search history.

(56) References Cited

U.S. PATENT DOCUMENTS

| 10,556,208 | B2* | 2/2020 | Moon | B01F 27/808 |
| --- | --- | --- | --- | --- |
| 10,638,867 | B2* | 5/2020 | Zhang | A47J 43/046 |
| 2012/0106288 | A1* | 5/2012 | Harada | B29B 7/845 366/75 |
| 2017/0231431 | A1 | 8/2017 | Maeng | |
| 2020/0205614 | A1* | 7/2020 | Ahn | B02C 18/16 |
| 2021/0022556 | A1* | 1/2021 | Chung | B01F 35/45 |

FOREIGN PATENT DOCUMENTS

| CN | 103027598 A | 4/2013 |
| --- | --- | --- |
| CN | 103110333 A | 5/2013 |
| CN | 203088842 U | 7/2013 |
| CN | 203693401 U | 7/2014 |
| CN | 203943509 U | 11/2014 |
| CN | 204218743 U | 3/2015 |
| CN | 204336722 U | 5/2015 |
| CN | 204813295 U | 12/2015 |
| CN | 204813533 U | 12/2015 |
| CN | 204813534 U | 12/2015 |
| CN | 105520659 A | 4/2016 |
| CN | 205286126 U | 6/2016 |
| CN | 205379221 U | 7/2016 |
| CN | 205433439 U | 8/2016 |
| CN | 205458224 U | 8/2016 |
| CN | 205458226 U | 8/2016 |
| CN | 105996824 A | 10/2016 |
| CN | 105996826 A | 10/2016 |
| CN | 205612343 U | 10/2016 |
| CN | 205612350 U | 10/2016 |
| CN | 205625689 U | 10/2016 |
| CN | 205658804 U | 10/2016 |
| CN | 106136831 A | 11/2016 |
| CN | 106235910 A | 12/2016 |
| CN | 205795471 U | 12/2016 |
| CN | 106308575 A | 1/2017 |
| CN | 205923822 U | 2/2017 |
| CN | 205994362 U | 3/2017 |
| CN | 205994373 U | 3/2017 |
| CN | 206062977 U | 4/2017 |
| CN | 206080063 U | 4/2017 |
| CN | 206102479 U | 4/2017 |
| CN | 106974565 A | 7/2017 |
| CN | 206333822 U | 7/2017 |
| CN | 206354938 U | 7/2017 |
| CN | 107051310 A * | 8/2017 | B01F 13/06 |
| CN | 206403656 U | 8/2017 |
| CN | 206560377 U | 10/2017 |
| CN | 206560387 U | 10/2017 |
| EP | 2904953 A1 | 8/2015 |
| EP | 3141169 A1 | 3/2017 |
| JP | H03168044 A | 7/1991 |
| JP | 2006219988 A | 8/2006 |
| JP | 2014073276 A | 4/2014 |
| KR | 20100023194 A | 3/2010 |
| KR | 101384979 B1 | 4/2014 |
| KR | 101565928 B1 | 11/2015 |
| KR | 101750798 B1 | 6/2017 |
| WO | 2016126652 A1 | 8/2016 |

OTHER PUBLICATIONS

Wang G, Translated Patent Application of CN 205923822 U (Year: 2017).*
International Search Report dated Nov. 5, 2018 corresponding to International Application No. PCT/CN2018/099073.
The first Office Action dated Apr. 23, 2020 in the corresponding CN application No. 201711128044.2.
The first Office Action dated Apr. 14, 2020 in the corresponding CN application No. 201711133340.1.
The first Office Action dated Apr. 27, 2020 in the corresponding CN application No. 201711133496.X.
The first Office Action dated Apr. 27, 2020 in the corresponding CN application No. 201711133498.9.
The first Office Action dated Apr. 14, 2020 in the corresponding CN application No. 201711133500.2.
The first Office Action dated Apr. 27, 2020 in the corresponding CN application No. 201711141527.6.

* cited by examiner

FOOD PROCESSOR

CROSS-REFERENCES TO RELATED APPLICATIONS

The present disclosure is a 371 National Phase Application of PCT Application No. PCT/CN2018/099073, filed on Aug. 7, 2018, which claims the priority of Chinese Patent Application Nos. 201711133496.X, 201711133499.3, 201711128043.8, 201711133641.4, 201711133498.9, 201711133497.4, 201711133340.1, 201711141527.6, 201721521043.X, 201721526830.3, 201721526826.7, 201721521045.9, 201721527104.3, 201721536331.2, 201721527003.6, 201721527130.6, 201711133500.2, 201721526648.8, 201721526104.1 and 201711128044.2, filed on Nov. 14, 2017, which are hereby incorporated by reference in their entirety.

FIELD

The present disclosure relates to the field of household appliances, in particular to a food processor.

BACKGROUND

During the process of stirring the ingredients in the food processor, after the ingredients in the cup body are crushed, it is easy to contact with the oxygen in the air to cause the ingredients to be oxidized, causing the nutrition of the ingredients to be lost or reducing the taste of the ingredients.

A vacuum pumping structure is provided in the food processor to prevent the ingredients from being oxidized during the stirring process. However, in the existing food processor, the vacuum pumping device is generally mounted on the base, and extends to the cup cover by providing an air path in the guide post fixedly connected to the base or an air path in the cup body. The design of the air path of the pumping structure makes the pumping air path too long, the overall structure is more complicated, and the reliability during the pumping process is poor.

SUMMARY

Embodiments of the present disclosure are to provide a food processor, which aims to simplify the pumping structure of the food processor, and improve the use convenience of the food processor.

Embodiments of the present disclosure provides a food processor, including:

a cup body;

a cup cover detachably connected to an upper end of the cup body, the cup cover including a pumping opening communicating with an inner cavity of the cup body, and being provided with a cover handle; and a vacuum pumping device detachably connected to the cup cover, the vacuum pumping device including a pumping hole and an exhaust hole, the pumping hole being configured to communicate with the pumping opening after the vacuum pumping device is mounted on the cup cover.

In some embodiments, the cup cover is concavely formed with a slot, the pumping opening is defined on a bottom wall of the slot, the vacuum pumping device includes a housing, the housing is formed with an insertion portion, the pumping hole is provided in the insertion portion, the insertion portion is embedded in the slot; and/or the pumping opening is lower than an upper edge of the cup body; and/or the pumping opening is located in a middle of the cup cover.

In some embodiments, a shape of a vertical section of the slot is trapezoidal or square, and an external contour shape of the insertion portion is adapted to the shape of the vertical section of the slot.

In some embodiments, a depth of the slot is a dimension of the slot extending in an axial direction of the cup body, and the depth of the slot is 5 mm to 50 mm.

In some embodiments, the vacuum pumping device further includes a first power supply structure and a pumping power element provided in the housing, the pumping power element is electrically connected to the first power supply structure, the food processor further includes a base, the cup body is mounted on the base, the base is provided with a second power supply structure, and the first power supply structure and the second power supply structure are independent of each other.

In some embodiments, a clamping slot is formed on an outer wall of the housing, the clamping slot is configured to surround the insertion portion, a first sealing ring is mounted in the clamping slot, and the first sealing ring is clamped by the vacuum pumping device and the cup cover after the vacuum pumping device is mounted on the cup cover.

In some embodiments, the cup cover is connected with a connecting portion at a periphery of the pumping opening, the connecting portion is configured to extend towards the inner cavity of the cup body, the vacuum pumping device protrudes from a sealing ring mounting portion at an outer wall of the insertion portion, the pumping hole is located inside the sealing ring mounting portion, the sealing ring mounting portion is configured to partially extend into the connecting portion and is connected to the connecting portion, a first sealing ring is sleeved outside the sealing ring mounting portion, and the first sealing ring is clamped by the vacuum pumping device and the cup cover after the vacuum pumping device is mounted on the cup cover.

In some embodiments, the first sealing ring is clamped between the outer wall of the insertion portion and the bottom wall of the slot.

In some embodiments, both the sealing ring mounting portion and the connecting portion are cylindrical;

the first sealing ring is clamped between the sealing ring mounting portion and the connecting portion; or the first sealing ring includes a first sealing portion and a second sealing portion connected to the first sealing portion, the first sealing portion is clamped between the insertion portion and the bottom wall of the slot, and the second sealing portion is clamped between the sealing ring mounting portion and the connecting portion.

In some embodiments, the cup cover is further provided with a connecting ring, the connecting ring is configured to surround the slot and extend towards the inner cavity of the cup body, an annular groove is formed on an outer wall of the connecting ring, a second sealing ring is embedded in the annular groove, and the second sealing ring is configured to abut on the inner wall of the cup body.

In some embodiments, the cup cover is further provided with a pressure relief hole communicating with the inner cavity of the cup body, and the cup cover is also provided with a pressure relief valve configured to open or close the pressure relief hole at the pressure relief hole.

In some embodiments, the pressure relief valve includes a pressure relief valve mounting portion, a valve wing connected to one end of the pressure relief valve mounting portion, and a pressure relief valve fixing portion connected to the other end of the pressure relief valve mounting portion, the cup cover further includes a mounting hole adjacent to the pressure relief hole, the pressure relief valve mounting portion is configured to slide through the mounting hole, the valve wing is located outside the cup cover, the pressure relief valve fixing portion is located inside the cup cover, the pressure relief valve is configured to slide relative to the mounting hole to allow the valve wing to open or close the pressure relief hole, and the pressure relief valve fixing portion is stopped by an inner wall of the cup cover after the valve wing is away from the pressure relief hole and configured to open the pressure relief hole.

In some embodiments, the pressure relief valve includes a pressure relief valve mounting portion, a pressing portion connected to one end of the pressure relief valve mounting portion, and a valve wing connected to the other end of the pressure relief valve mounting portion, the pressure relief valve mounting portion is configured to slide through the mounting hole, the pressing portion is located outside the cup cover, the valve wing is located inside the cup cover; and the pressure relief valve mounting portion is further sleeved with an elastic member, one end of the elastic member is configured to abut on the pressing portion, and the other end of the elastic member is configured to abut on the cup cover, the elastic member provides an elastic force to drive the valve wing to abut on the inner surface of the cup cover and cover the pressure relief hole, and under an external force, the valve wing is away from the pressure relief hole and configured to open the pressure relief hole.

In some embodiments, the vacuum pumping device includes a housing and a pumping power element, a closed receiving cavity is formed on the housing, the pumping power element is received in the receiving cavity, the housing is provided with a pumping hole, a pressure relief hole, and an exhaust hole, the pumping hole and the pressure relief hole both are configured to communicate with the receiving cavity, an air inlet of the pumping power element is configured to communicate with the receiving cavity, the exhaust hole is configured to communicate with an air outlet of the pumping power element through a pipeline, and the pumping hole is configured to communicate with the pumping opening after the vacuum pumping device is mounted on the cup cover; and the pumping hole, the receiving cavity, and the pressure relief hole are configured to communicate with each other to form a pressure relief air path, and the pumping hole, the receiving cavity, the pumping power element, and the exhaust hole are configured to communicate with each other to form a pumping air path.

In some embodiments, the vacuum pumping device is detachably connected to the cup cover through a clamping structure, a screw structure or a magnetic suction structure.

In some embodiments, a mounting detection structure for detecting whether the vacuum pumping device is mounted on the cup cover is provided between the cup cover and the vacuum pumping device.

In some embodiments, the food processor further includes a waterproof and breathable structure, the waterproof and breathable structure is mounted on the cup cover and configured to cover the pumping opening, or the waterproof and breathable structure is mounted on the vacuum pumping device and configured to cover the pumping hole.

In some embodiments, the vacuum pumping device includes a housing and a pumping power element, a receiving cavity is formed on the housing, the pumping power element is received in the receiving cavity; and the vacuum pumping device further includes a control circuit board and a start switch mounted on the housing, and the control circuit board is configured to receive start signal of the start switch and control the pumping power element to start.

In some embodiments, the food processor further includes a detection module, the detection module is received in the receiving cavity and connected to the control circuit board and/or the pumping power element, and the detection module is configured to detect a current, a suction pressure, or a running time of the pumping power element.

In some embodiments, the food processor includes a wall-breaking machine, a blender, and a juicer.

Embodiments of the present disclosure disclose the vacuum pumping device is detachably connected to the cup cover. The vacuum pumping device is not fixed to the base of the food processor. As such, the vacuum pumping device can form a pumping air path in itself. When the food processor needs to evacuate, the vacuum pumping device is mounted on the cup cover. The pumping hole of the vacuum pumping device communicates with the pumping opening of the cup cover, so that the pumping gas path in the vacuum pumping device can directly lead to the cup body. The vacuuming function of the food processor is realized through a simple gas path structure. It prevents the ingredients from being oxidized during the process of stirring the ingredients in the food processor, which improves the use effect of the food processor. Meanwhile, the vacuum pumping device is detachably connected to the cup cover, and the food processor does not need to be provided with a mounting structure of the vacuum pumping device on the cup body or the base, so that the overall structure of the food processor is simplified, and the volume of the food processor is also reduced.

BRIEF DESCRIPTION OF THE DRAWINGS

In order to more clearly illustrate the embodiments of the present disclosure, the drawings will be briefly described below. The drawings in the following description are only some embodiments of the present disclosure.

Figure 1:
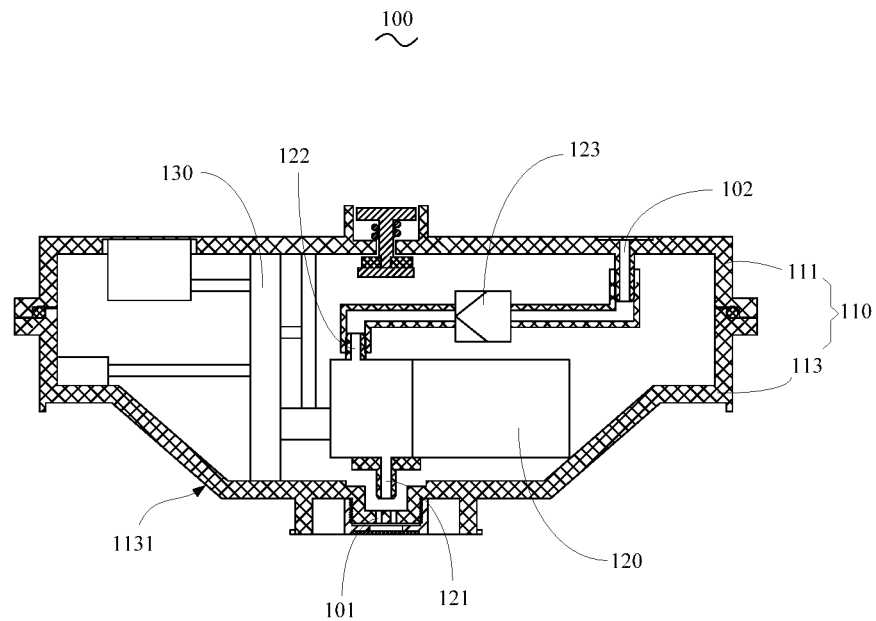
FIG. 1 is a structural diagram of a vacuum pumping device according to a first embodiment of the present disclosure.

Description of reference numerals:

TABLE 1

| Label | Name | Label | Name |
| --- | --- | --- | --- |
| 100 | vacuum pumping device | 301 | pumping opening |
| 101 | pumping hole | 310 | connecting portion |
| 102 | exhaust hole | 3101 | second protrusion |
| 102a | gap | 3103 | internal thread |
| 103, 302 | pressure relief hole | 3105 | magnetic member |
| 104, 303 | mounting hole | 320 | connecting ring |
| 110 | housing | 3201 | annular groove |
| 111 | upper housing | 3011 | slot |
| 1111, 3013 | limiting groove | 330 | cover handle |
| 1113, 3015 | limiting cylinder | 400 | mounting detection structure |
| 1115 | switch fixing member | 410 | trigger switch |
| 1116 | switch limiting member | 420 | trigger member |
| 1117 | mounting space | 500 | cup body |
| 1118 | limiting portion | 600 | pressure relief valve |
| 113 | lower housing | 610 | pressure relief valve mounting portion |
| 1131 | insertion portion | 620 | valve wing |
| 1133 | clamping slot | 630 | pressure relief valve fixing portion |
| 115 | sealing ring mounting portion | 640 | pressing portion |
| 1151 | first protrusion | 650 | sealing gasket |
| 1153 | external thread | 660 | elastic member |
| 1155 | first magnetic member | 700 | base |
| 120 | pumping power element | 810 | mounting cylinder |
| 121 | air inlet | 820 | waterproof and breathable membrane |
| 122 | air outlet | 900 | food processor |
| 123 | check valve | 901 | first sealing ring |
| 130 | control circuit board | 9011 | first sealing portion |
| 140 | first power supply structure | 9013 | second sealing portion |

TABLE 1-continued

| Label | Name | Label | Name |
| --- | --- | --- | --- |
| 150 | start switch | 902 | second sealing ring |
| 300 | cup cover | | |

DETAILED DESCRIPTION OF THE DISCLOSURE

Embodiments of the present disclosure will be clearly and completely described in the following with reference to the accompanying drawings.

It is to be understood that, all of the directional instructions in the embodiments of the present disclosure (such as up, down, left, right, front, rear . . . ) can only be used for explaining relative position relations, moving condition of the elements under a predetermined form (referring to figures), and so on, if the predetermined form changes, the directional instructions changes accordingly.

In the present disclosure, unless specified or limited otherwise, the terms "connected", "fixed" and the like are used broadly. For example, "fixed" can be fixed connections, detachable connections, or integral connections; may also be mechanical or electrical connections; may also be direct connections or indirect connections via intervening structures, may also be inner connecting of two elements, or interaction relationship between two elements.

The present disclosure provides a vacuum pumping device 100. The vacuum pumping device 100 can be used for vacuum processing before the ingredients of the food processor 900 are stirred, so that the ingredients in the food processor 900 can be stirred under a vacuum environment, to prevent the ingredients from interacting with the air during the stirring process and from being oxidized to cause the loss of nutrients, or affect the appearance and taste of the ingredients. The vacuum pumping device 100 can be transported and stored as an independent object. That is, the vacuum pumping device 100 of the present disclosure is not fixedly connected to the food processor 900, and the vacuum pumping device 100 is combined with the food processor 900 only when the food processor 900 needs to be evacuated, to evacuate the inner cavity of the cup body 500 of the stirring cup of the food processor 900. When the vacuum pumping device 100 of the present disclosure is used, it is assembled with the cup cover 300 of the food processor 900 to evacuate the inner cavity of the cup body 500.

Referring to FIG. 1 to FIG. 4, the specific structure of the vacuum pumping device 100 of the present disclosure is as follows. The vacuum pumping device 100 includes a housing 110, a pumping power element 120, a control circuit board 130, and a first power supply structure 140. A receiving cavity (not shown) is formed in the housing 110. The housing 110 includes a pumping hole 101 and an exhaust hole 102. The pumping power element 120, the control circuit board 130, and the first power supply structure 140 are received in the receiving cavity. The control circuit board 130 is electrically connected to the pumping power element 120 and the first power supply structure 140 respectively.

The pumping power element 120 may be a vacuum pump including an air inlet 121 and an air outlet 122. The air inlet 121 communicates with the pumping hole 101 on the housing 110. The air outlet 122 communicates with the exhaust hole 102 on the housing 110. The air extracted by the food processor 900 enters the air inlet 121 of the pumping power element 120 through the pumping hole 101.

Driven by the pumping power element 120, air flows through the air outlet 122 and finally exits the housing 110 through the exhaust hole 102. During this process, the control circuit board 130 controls the operation of the pumping power element 120, and the first power supply structure 140 provides energy for the operation of the entire vacuum pumping device 100.

Embodiments of the present disclosure disclose the vacuum pumping device 100 includes a housing 110, a pumping power element 120 provided in the housing 110, and a control circuit board 130. The vacuum pumping device 100 can be set independently and can perform vacuuming operation on the food processor 900, so that it is convenient to use and also has the effect of convenient storage. Meanwhile, by designing a vacuum pumping device 100 that is independent of the base 700 of the food processor 900, the vacuum pumping device 100 and the food processor 900 can be placed separately when the vacuuming operation is not performed. Compared with the solution in which the existing vacuum pumping device 100 and the food processor 900 are integrated, the embodiments of the present disclosure can also reduce the volume of the food processor 900.

The housing 110 of the present disclosure includes an upper housing 111 and a lower housing 113. The upper housing 111 and the lower housing 113 are interlocked with each other and form the receiving cavity. The receiving cavity is formed in the housing 110. The upper housing 111 and the lower housing 113 may be made of plastic. The upper housing 111 and the lower housing 113 may be provided with snap structures matching with each other at their peripheral edges to achieve a snap connection between the two, or one of the upper housing 111 and the lower housing 113 may be provided with a groove structure at the peripheral edge, the other of the upper housing 111 and the lower housing 113 snaps into the groove, and the two are connected by screws or glue. The pumping power element 120 and the control circuit board 130 are both provided in the receiving cavity. The upper housing 111 and the housing 110 may extend a mounting plate in the receiving cavity. The pumping power element 120 and the control circuit board 130 can be clamped or screwed to the mounting plate, to be relatively fixed to the housing 110.

Since the vacuum pumping device 100 performs vacuuming operation on the food processor 900, the air tightness of the vacuum pumping device 100 and the convenience of the cleaning operation need to be considered. In the present disclosure, the upper housing 111 may be snap-fitted to the lower housing 113 to achieve the detachable connection of the housing 110, and a sealing ring is provided between the upper housing 111 and the lower housing 113. In this way, it is convenient to disassemble and assemble the pumping power element 120 and the control circuit board 130 and other components in the housing 110 to ensure convenient cleaning operation. In order to ensure the airtightness during the pumping process, in the present disclosure, the following design is performed on the air path of the vacuum pumping device 100.

Referring to FIG. 1, in the first pumping air path structure, the receiving cavity formed by the upper housing 111 and the lower housing 113 is a closed cavity, and the pumping hole 101 communicates with the receiving cavity. The air inlet 121 of the pumping power element 120 communicates with the receiving cavity, and the air outlet 122 of the pumping power element 120 communicates with the exhaust hole 102 through a pipeline. In the first air path structure, the receiving cavity is a part of the pumping air path channel. As such, during the operation of the vacuum pumping device 100, the heat generated by the control circuit board 130 and the pumping power element 120 can be discharged together with the airflow, which can make the heat dissipation performance of the vacuum pumping device 100 better.

Figure 2:
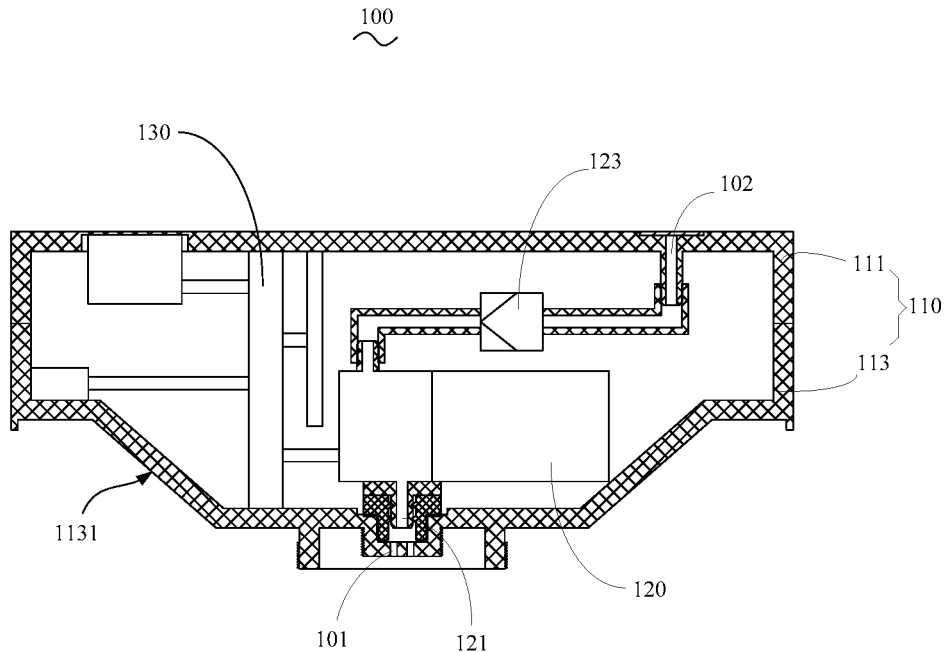
FIG. 2 is a schematic cross-sectional structural diagram of the vacuum pumping device according to a second embodiment of the present disclosure.

Referring to FIG. 2, in the second pumping air path structure, the receiving cavity formed by the upper housing 111 and the lower housing 113 is a closed cavity. The air inlet 121 of the pumping power element 120 communicates with the pumping hole 101 through a pipeline, and the air outlet 122 of the pumping power element 120 communicates with the exhaust hole 102 through a pipeline. The pumping air path of the second pumping air path structure is relatively sealed, and is relatively stable during the pumping process.

Figure 3:
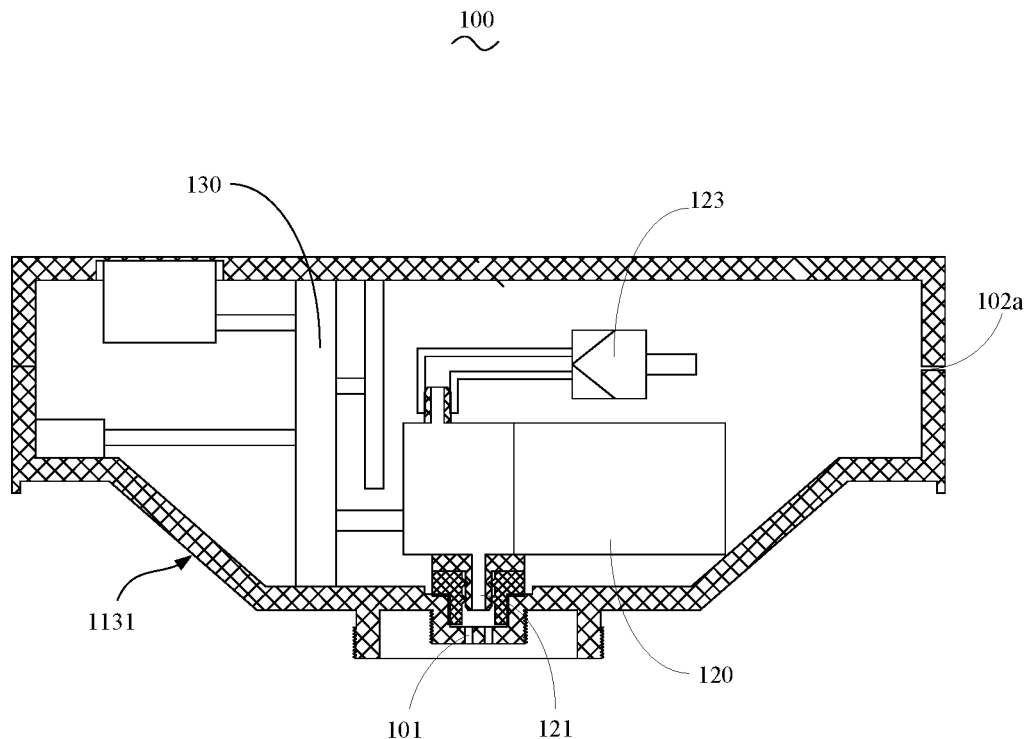
FIG. 3 is a schematic cross-sectional structural diagram of the vacuum pumping device according to a third embodiment of the present disclosure.

Referring to FIG. 3, in the third pumping air path structure, the housing 110 is provided with a gap 102a communicating with the receiving cavity and the outside. The air inlet 121 of the pumping power element 120 communicates with the pumping hole 101 through a pipeline, the air outlet 122 of the pumping power element 120 communicates with the receiving cavity, and the exhaust hole 102 is formed in the gap 102a. In the third pumping air path structure, after the upper housing 111 and the lower housing 113 are engaged, a closed cavity is not formed, and the gap 102a between the upper housing 111 and the lower housing 113 is configured to form the exhaust hole 102 of the pumping device. The air outlet 122 of the pumping power element 120 communicates with the receiving cavity so that the receiving cavity also forms part of the pumping air path. During the pumping process, air is discharged from the gap 102a. The effect achieved by the third air path is similar to that of the first air path, and will not be described again.

Figure 4:
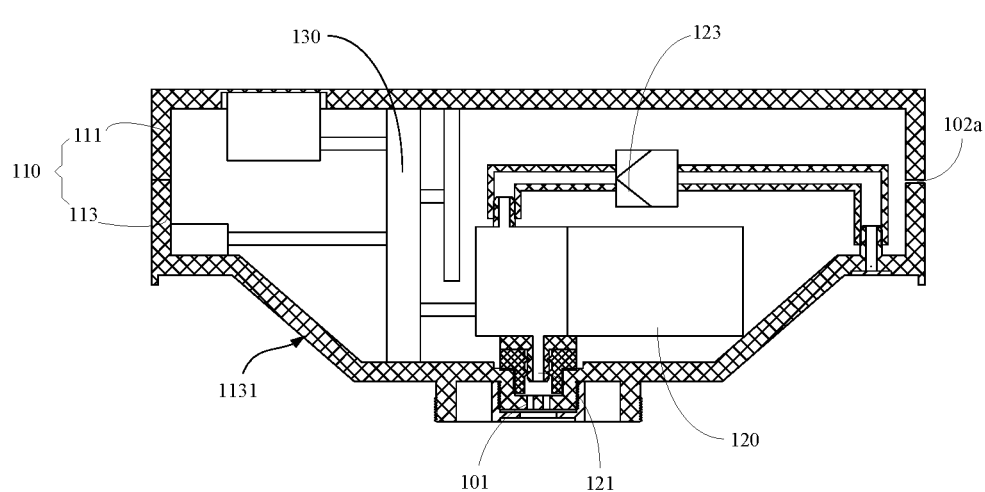
FIG. 4 is a schematic cross-sectional structural diagram of the vacuum pumping device according to a fourth embodiment of the present disclosure.

Referring to FIG. 4, in the fourth pumping air path structure, after the upper housing 111 and the lower housing 113 are engaged, a closed cavity is not formed but a gap 102a is formed. The housing 110 further defines an exhaust hole 102 outside the gap 102a, and the air outlet 122 of the pumping power element 120 communicates with the exhaust hole 102 through a pipeline. In the fourth air path structure, the pumping power element 120 and the control circuit board 130 in the receiving cavity can exchange heat with the outside air through the gap to naturally dissipate heat, and the pumping air path is relatively closed, which is more stable during the pumping process.

Further, in the above air path structures of the pumping device of the present disclosure, a check valve 123 may be provided at the air outlet 122 of the pumping power element, to ensure that the outside air will not return during vacuuming, thus improving the air extraction effect.

Further, the pumping hole 101 is defined in the lower housing 113, and the exhaust hole 102 may be defined in the upper housing 111 or the lower housing 113. When the exhaust hole 102 is defined in the upper housing 111, the air is exhausted upward during vacuuming, and the structure is relatively simple. When the exhaust hole 102 is defined in the lower housing 113, the air is exhausted downward during vacuuming, so that the airflow is not easy to rush to the user during the exhaust process, and it is safer during use.

The present disclosure further provides a food processor 900 applying the above vacuum pumping device 100. The food processor 900 may include small household appliances such as a soymilk machine, a wall-breaking machine, a juicer, and a blender. The vacuum pumping device 100 performs vacuuming treatment before the ingredients of the food processor 900 are stirred, to avoid the oxidation of the ingredients in the food processor 900 and oxygen in the air during the stirring process to cause the loss of nutrients and the deterioration of the taste and quality of the ingredients.

Referring to FIG. 5 to FIG. 8, the food processor 900 includes a cup body 500, a cup cover 300, and a vacuum pumping device 100 as described above. When the vacuum pumping device 100 is applied to the food processor 900, the structural improvement and adjustment can also be carried out on the basis of the above structure according to the actual application. The cup cover 300 is detachably connected to an upper end of the cup body 500, the cup cover 300 includes a pumping opening 301 communicating with an inner cavity of the cup body 500. The vacuum pumping device 100 is detachably connected to the cup cover 300. The pumping hole 101 is configured to communicate with the pumping opening 301 after the vacuum pumping device 100 is mounted on the cup cover 300. The side wall of the cup body 500 is provided with a handle (not shown), and the cup cover 300 is further provided with a cover handle 330 which extends outwards for a length range. By providing the cover handle 330, it is convenient for the user to push or open the cover through the cover handle 330. When closing the cup cover in place, the cover handle 330 corresponds to the handle. When you want to open the cup cover, push the cover handle 330 axially or radially to open and close the cup cover effortlessly, which is convenient for the user to operate.

In the present disclosure, the cross-sectional area of the upper opening of the cup body 500 of the food processor 900 is larger than the cross-sectional area of the lower opening. A handle is provided on the cup wall of the cup body 500 to facilitate the handling of the food processor 900 during use. The detachable connection of the vacuum pumping device 100 and the cup cover 300 can be achieved by providing a structure in which the cup cover 300 and the vacuum pumping device 100 are connected to each other, or by other components. The present disclosure will introduce the embodiments of detachable connection in detail in the following content. In the present disclosure, after the vacuum pumping device 100 is connected to the cup cover 300, the vacuum pumping device 100 is located above the food processor 900, which facilitates the disassembly and assembly of the entire structure. When the food processor 900 is used, after the ingredients are put into the cup body 500, the cup cover 300 covers the cup body 500, and then the vacuum pumping device 100 is mounted on the cup cover 300 to evacuate the cup body 500.

Embodiments of the present disclosure, the vacuum pumping device 100 is detachably connected to the cup cover 300. As such, the vacuum pumping device 100 and the cup cover 300 of the food processor 900 are independent of each other. The vacuum pumping device 100 can realize the vacuum treatment of the cup body 500, and is also convenient to be stored separately after use, which is more convenient to use. The pumping opening 301 is provided on the cup cover 300 to cooperate with the vacuum pumping device 100 during vacuuming. As such, the vacuum pumping device 100 can extract the air in the inner cavity of the cup body 500 with a simple structure. The structure is simple and the cost is low.

Further, in order to realize that when the vacuum pumping device 100 is detachably connected to the cup cover 300, the process is more convenient and the connection structure is stable, in the present disclosure, the cup cover 300 is concavely formed with a slot 3011, the pumping opening 301 is provided on a bottom wall of the slot 3011, the vacuum pumping device 100 includes a housing 110, the housing 110 is formed with an insertion portion 1131, and the insertion portion 1131 is embedded in the slot 3011 when the vacuum pumping device 100 is mounted on the cup cover 300. As such, when the vacuum pumping device 100 is mounted on the cup cover 300, the overall structure will not be too high, reducing the height of the whole machine, and it is more convenient for users to place and store the machine after using the machine. The pumping opening 301 may be lower than an upper edge of the cup body 500; and/or the pumping opening 301 is located in a middle of the cup cover 300. When the pumping opening 301 is lower than the upper edge of the cup body 500, the product design is more reasonable, reducing the height of the entire product. The pumping opening 301 is located in the middle of the cup cover 300, and can be used as a blanking port, and when the vacuum pumping device 100 is removed, the material is added to the pumping opening 301 located in the middle, the material just falls on the stirring component (including the stirring knife) in the cup body 500 or is evenly distributed around the stirring component, and the processing of the material is more uniform.

A shape of a vertical section of the slot 3011 is trapezoidal or square, and an external contour shape of the insertion portion 1131 is adapted to the shape of the vertical section of the slot 3011. The insertion portion 1131 of the present disclosure is convexly formed on the lower end of the vacuum pumping device 100. The insertion portion 1131 is formed by the housing 110 of the vacuum pumping device 100. The overall shape of the insertion portion 1131 may be tapered or cylindrical, or a cubic shape. Through the cooperation of the insertion portion 1131 and the clamping slot 1133 of the cup cover 300, the alignment is more convenient when the vacuum pumping device 100 is mounted on the cup cover 300. Meanwhile, the pumping opening 301 is provided on the bottom wall of the slot 3011, and the pumping hole 101 is correspondingly provided on the insertion portion 1131, and when the insertion portion 1131 is inserted into the slot 3011, the pumping opening 301 and the pumping hole 101 can be communicated with each other.

A depth of the slot 3011 is a dimension of the slot 3011 extending in an axial direction of the cup body 500, and the depth of the slot 3011 is 5 mm to 50 mm. The depth of the slot 3011 is set to the above numerical range, so that after the vacuum pumping device 100 is assembled to the cup cover 300, the vacuum pumping device 100 is less likely to shake.

After the vacuum pumping device 100 is assembled to the cup cover 300, in order to ensure the airtightness of the pumping process, the present disclosure further provides a sealing structure between the vacuum pumping device 100 and the cup cover 300, and various scheme designs have also been performed on the sealing structure.

Figure 5:
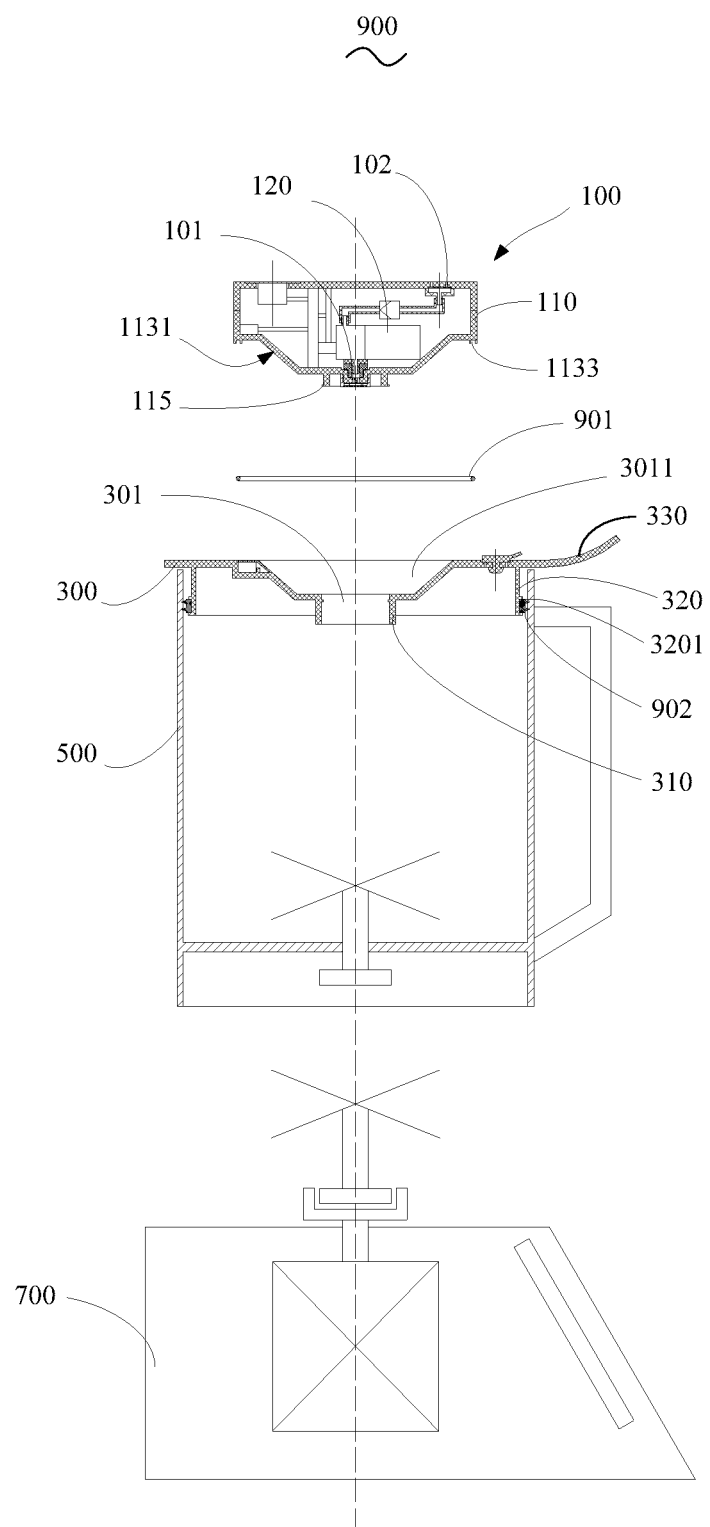
FIG. 5 is a schematic cross-sectional structural diagram of a food processor according to a first embodiment of the present disclosure.

Referring to FIG. 5, in an embodiment, a clamping slot 1133 is formed on an outer wall of the housing 110, the clamping slot 1133 is configured to surround the insertion portion 1131, a first sealing ring 901 is mounted in the clamping slot 1133, and the first sealing ring 901 is clamped by the vacuum pumping device 100 and the cup cover 300 after the vacuum pumping device 100 is mounted on the cup cover 300. The first sealing ring 901 may be made of silica gel, which has a circular ring shape. When the vacuum pumping device 100 is mounted on the cup cover 300, the first sealing ring 901 will elastically abut on the surface of the cup cover 300 to seal the two. With this sealing method, the sealing ring is clamped on the periphery of the slot 3011, and the structure is relatively simple.

Figure 6:
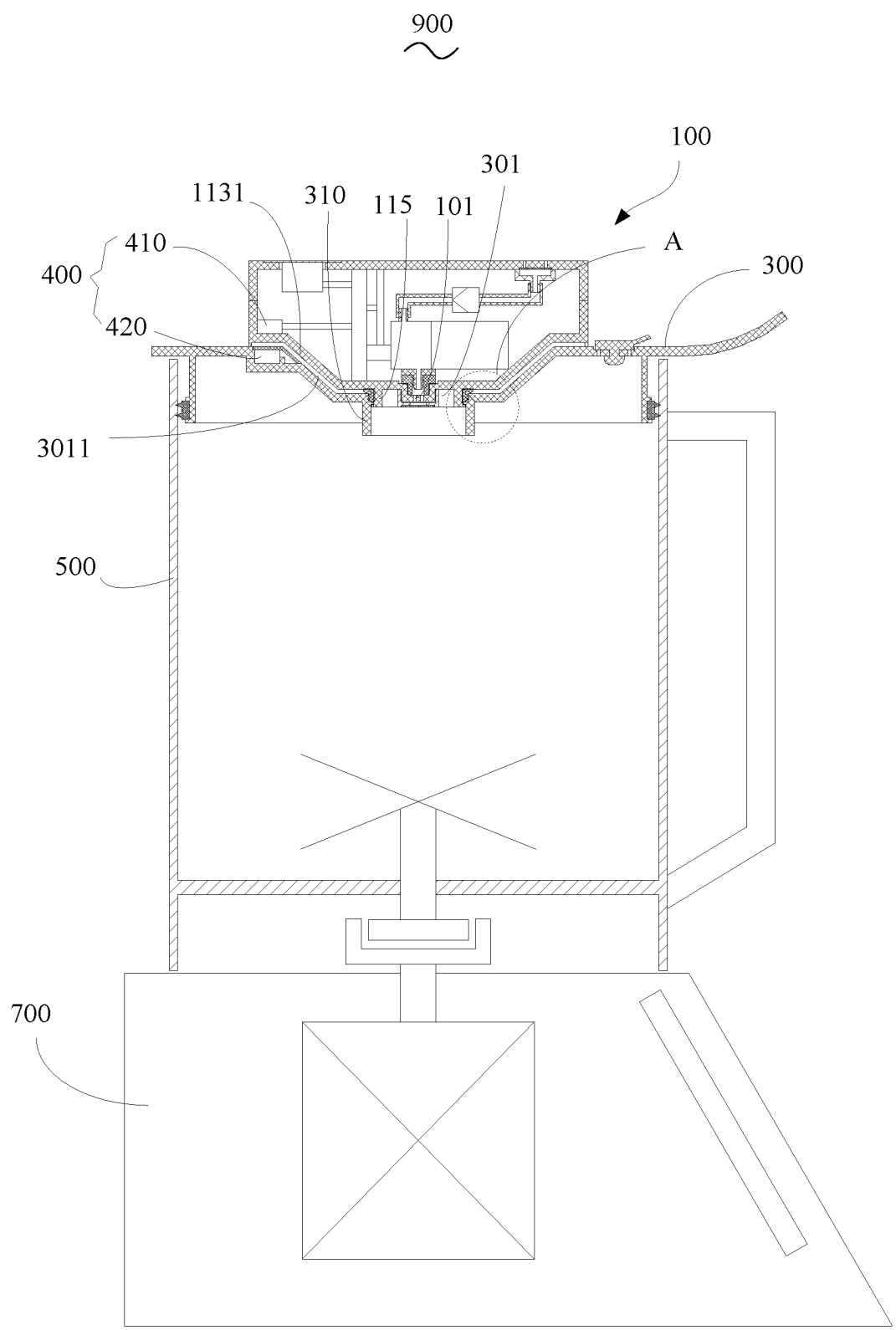
FIG. 6 is a schematic cross-sectional structural diagram of the food processor according to a second embodiment of the present disclosure.
Figure 7:
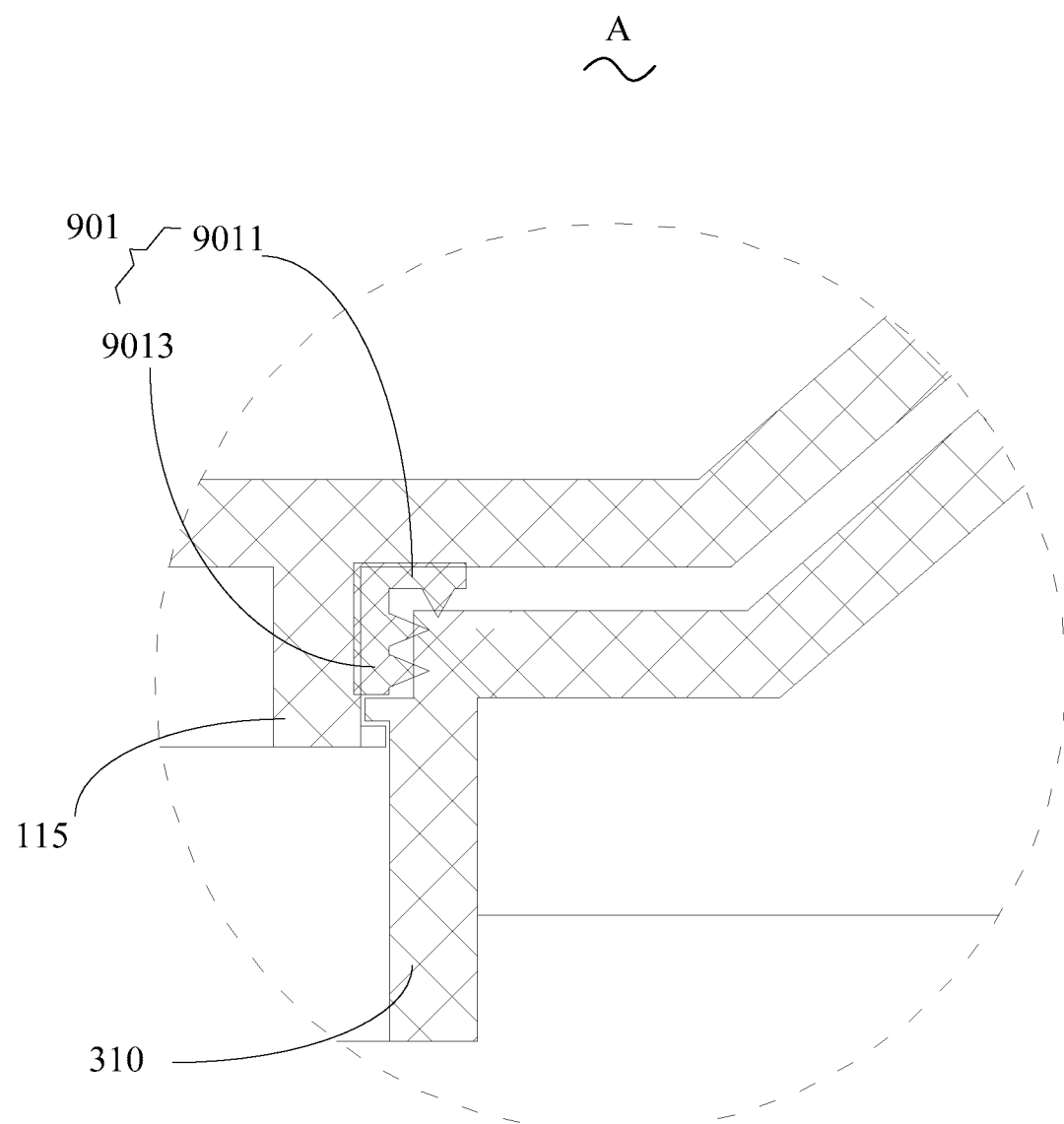
FIG. 7 is an enlarged schematic view at portion A in FIG. 6.
Figure 8:
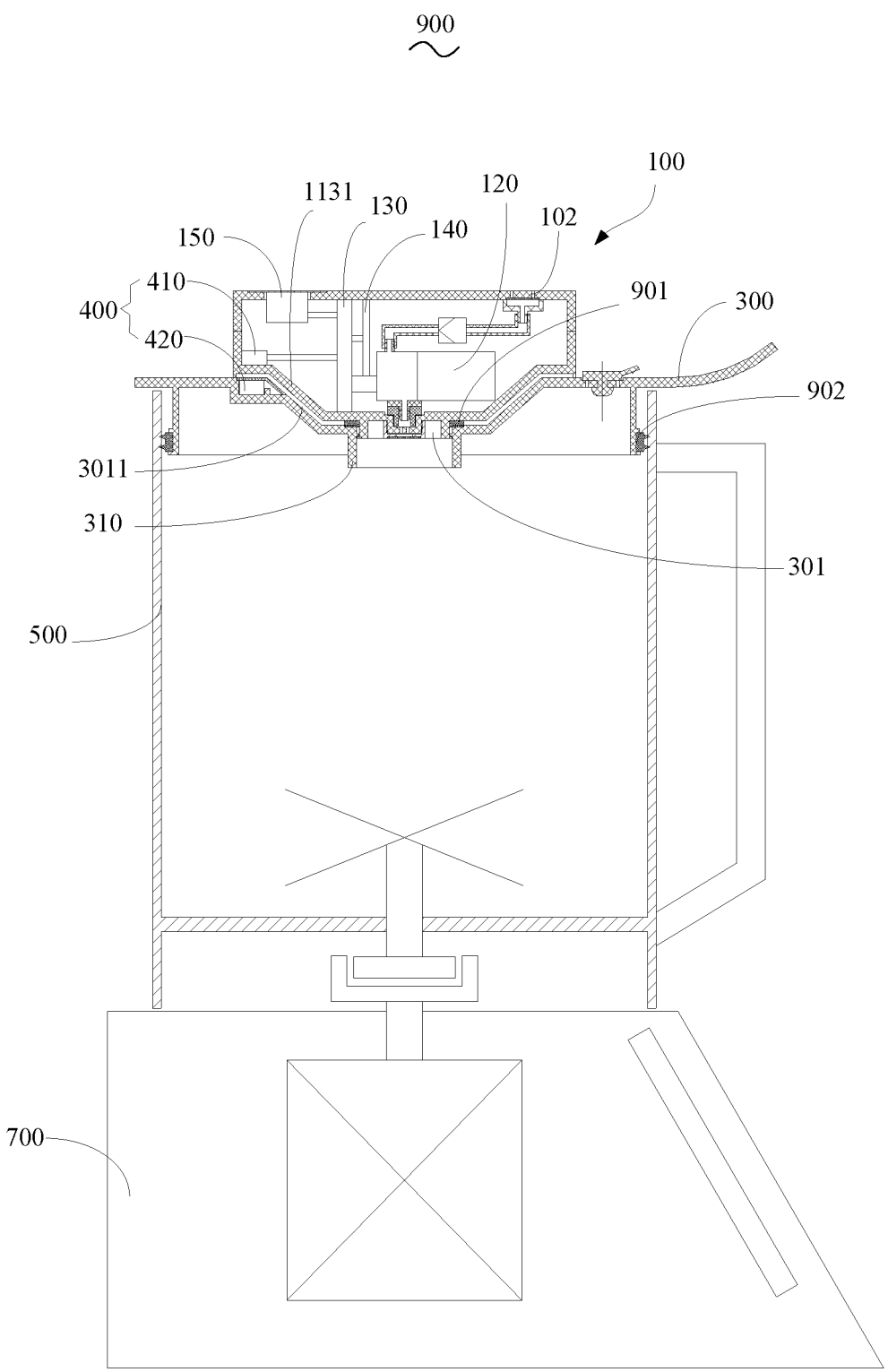
FIG. 8 is a schematic cross-sectional structural diagram of the food processor according to a third embodiment of the present disclosure.

Referring to FIG. 6 to FIG. 8, in an embodiment of the sealing structure, the cup cover 300 is connected with a connecting portion 310 at a periphery of the pumping opening 301, the connecting portion 310 extends towards the inner cavity of the cup body 500, the vacuum pumping device 100 protrudes from a sealing ring mounting portion 115 at an outer wall of the insertion portion 1131, the pumping hole 101 is located inside the sealing ring mounting portion 115, the sealing ring mounting portion 115 partially extends into the connecting portion 310 and is connected to the connecting portion 310, a first sealing ring 901 is sleeved outside the sealing ring mounting portion 115, and the first sealing ring 901 is clamped by the vacuum pumping device 100 and the cup cover 300 after the vacuum pumping device 100 is mounted on the cup cover 300. FIGS. 6 to 8 show two structural forms in which the vacuum pumping device 100 and the cup cover 300 are sealed in the slot 3011, the sealing ring mounting portion 115 and the connecting portion 310 are both cylindrical.

As shown in FIG. 8, the first sealing ring 901 is clamped between the outer wall of the insertion portion 1131 and the bottom wall of the slot 3011. The sealing structure is simple.

In a feasible sealing method (not shown), the first sealing ring 901 is clamped between the sealing ring mounting portion 115 and the connecting portion 310. In such a sealing structure, the first sealing ring 901 is cylindrical, and is clamped between the sealing ring mounting portion 115 and the connecting portion 310 to achieve radial sealing. It should be understood that the first sealing ring 901 is clamped between the sealing ring mounting portion 115 and the connecting portion 310, and the sealing ring mounting portion 115 and the connecting portion 310 are configured to match with the slot 3011 and the insertion portion 1131, and the vacuum pumping device 100 is detachably connected to the cup cover 300.

As shown in FIG. 6 and FIG. 7, the first sealing ring 901 includes a first sealing portion 9011 and a second sealing portion 9013 connected to the first sealing portion 9011, the first sealing portion 9011 is clamped between the insertion portion 1131 and the bottom wall of the slot 3011, and the second sealing portion 9013 is clamped between the sealing ring mounting portion 115 and the connecting portion 310. In such a sealing structure, the first sealing ring 901 has a T-shaped cross section, which not only realizes a radial seal between the sealing ring mounting portion 115 and the connecting portion 310, but also realizes an axial seal between the outer wall of the insertion portion 1131 and the bottom wall of the mounting groove. While having such a good sealing effect, the connection and fixation of the vacuum pumping device 100 and the cup cover 300 can also be achieved, and the detachable connection of the vacuum pumping device 100 and the cup cover 300 can be realized.

Further, the cup cover 300 is further provided with a connecting ring 320, the connecting ring 320 is configured to surround the slot 3011 and extend towards the inner cavity of the cup body 500, an annular groove 3201 is formed on an outer wall of the connecting ring 320, a second sealing ring 902 is embedded in the annular groove 3201, and the second sealing ring 902 is configured to abut on the inner wall of the cup body 500.

In the present disclosure, the vacuum pumping device 100 is detachably connected to the cup cover 300 through a clamping structure, a screw structure or a magnetic suction structure.

Figure 9:
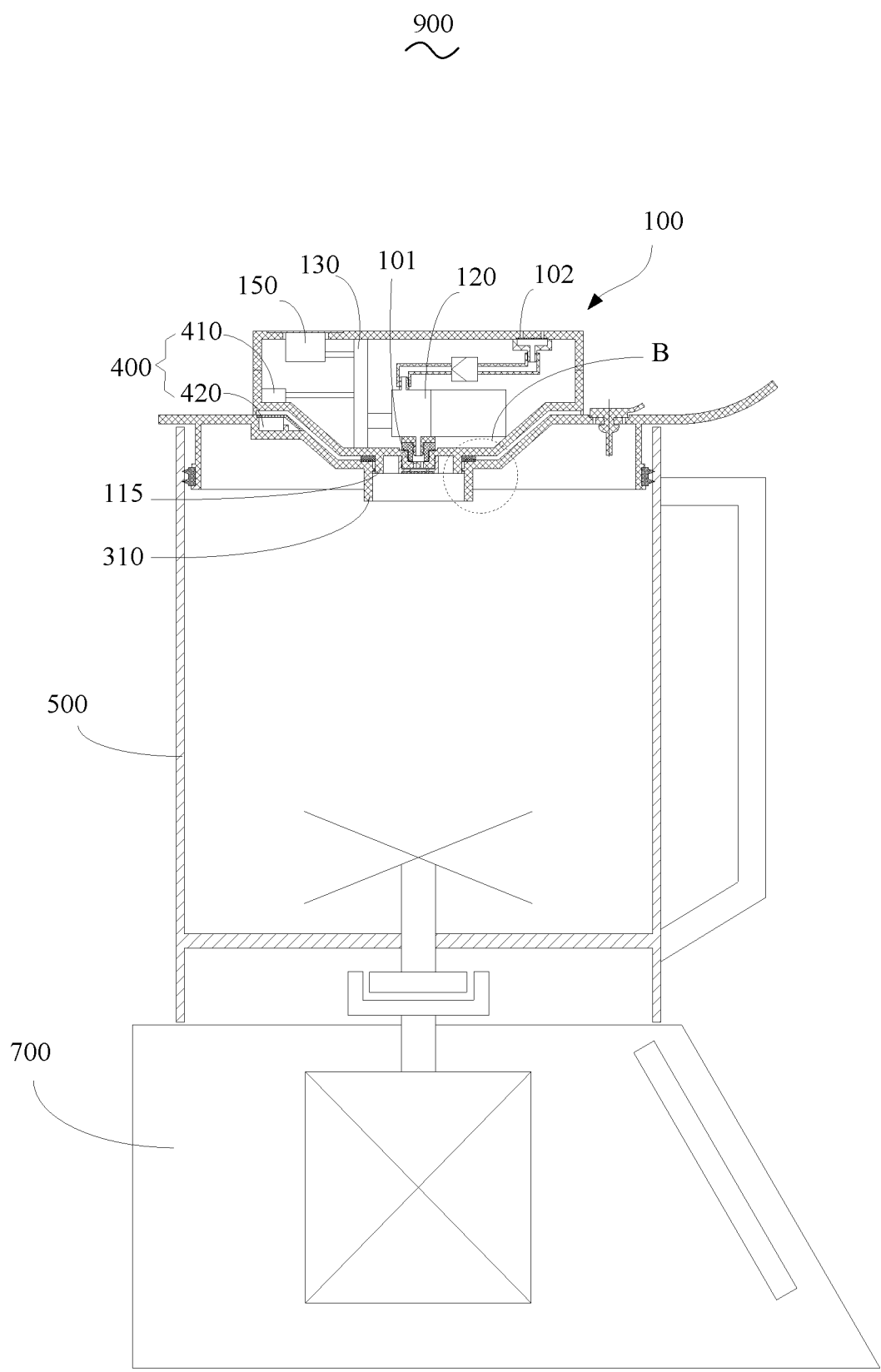
FIG. 9 is a schematic cross-sectional structural diagram of the food processor according to a fourth embodiment of the present disclosure.
Figure 10:
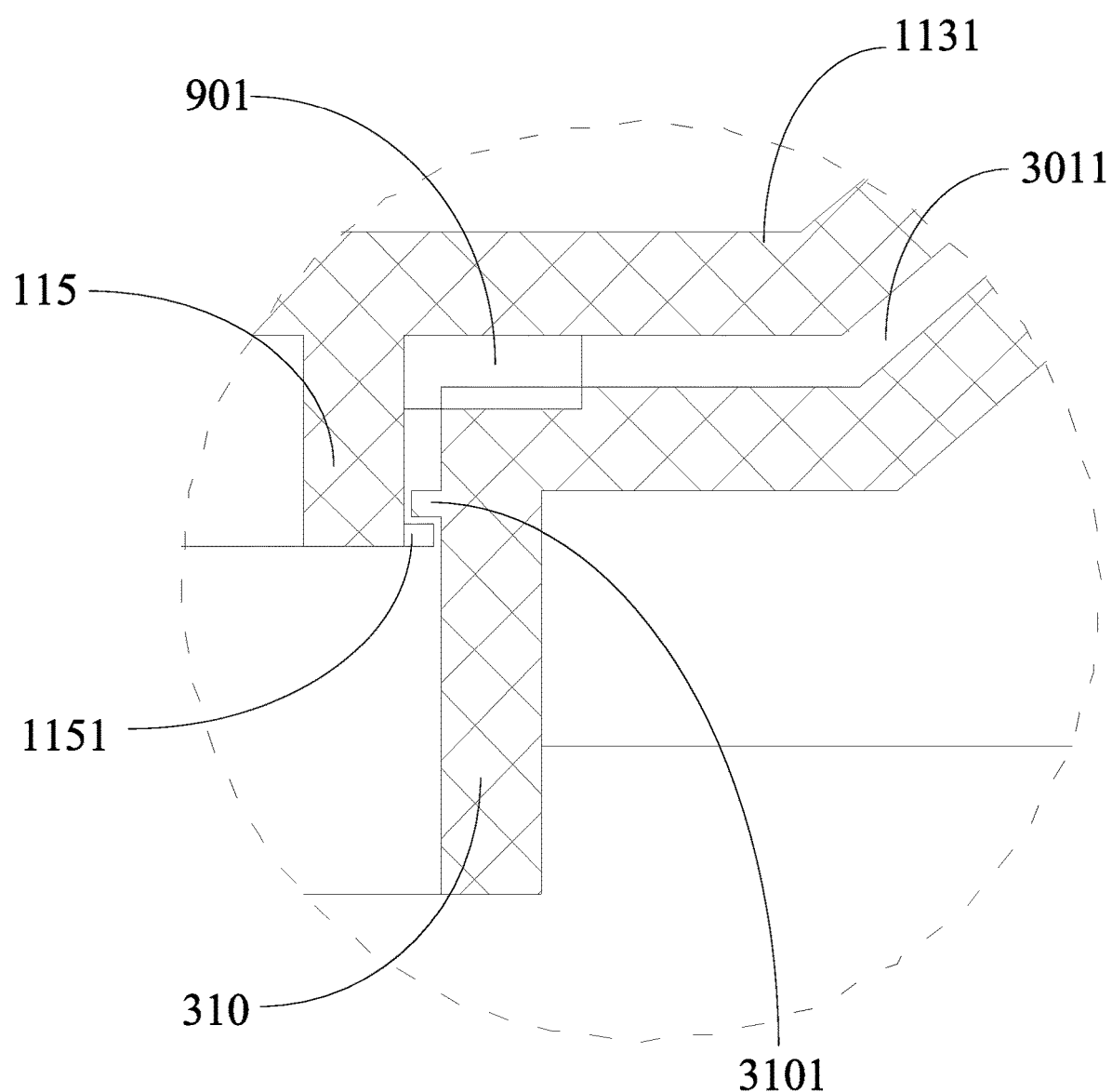
FIG. 10 is an enlarged schematic view at portion B in FIG. 9.

Referring to FIG. 9 and FIG. 10, when the pumping opening 301 is provided on the bottom wall of the slot 3011, the clamping structure includes a plurality of first protrusions 1151 protruding from the outer wall of the sealing ring mounting portion 115 of the cylindrical structure and a plurality of second protrusions 3101 protruding from the inner wall of the connecting portion 310 of the cylindrical structure. The sealing ring mounting portion 115 partially extends into the connecting portion 310, and is clamped with the connecting portion 310 through the cooperation of the first protrusion 1151 and the second protrusion 3101. The first protrusions 1151 are spaced apart from each other in the circumferential direction of the structure to which they are attached, and the second protrusions 3101 are spaced apart from each other in the circumferential direction of the structure to which they are attached. In the present disclosure, during the installation of the vacuum pumping device 100, the second protrusion 3101 passes through two adjacent lower surfaces abutting on the first protrusion 1151 to achieve axial tension. As can be seen from the above, in the present disclosure, the sealing structure is provided between the vacuum pumping device 100 and the cup cover 300, i.e., after the first protrusion 1151 and the second protrusion 3101 abut each other, under the action of the pre-tensioning force generated by the first sealing ring 901, the connection structure of the vacuum pumping device 100 and the cup cover 300 is stronger.

Figure 11:
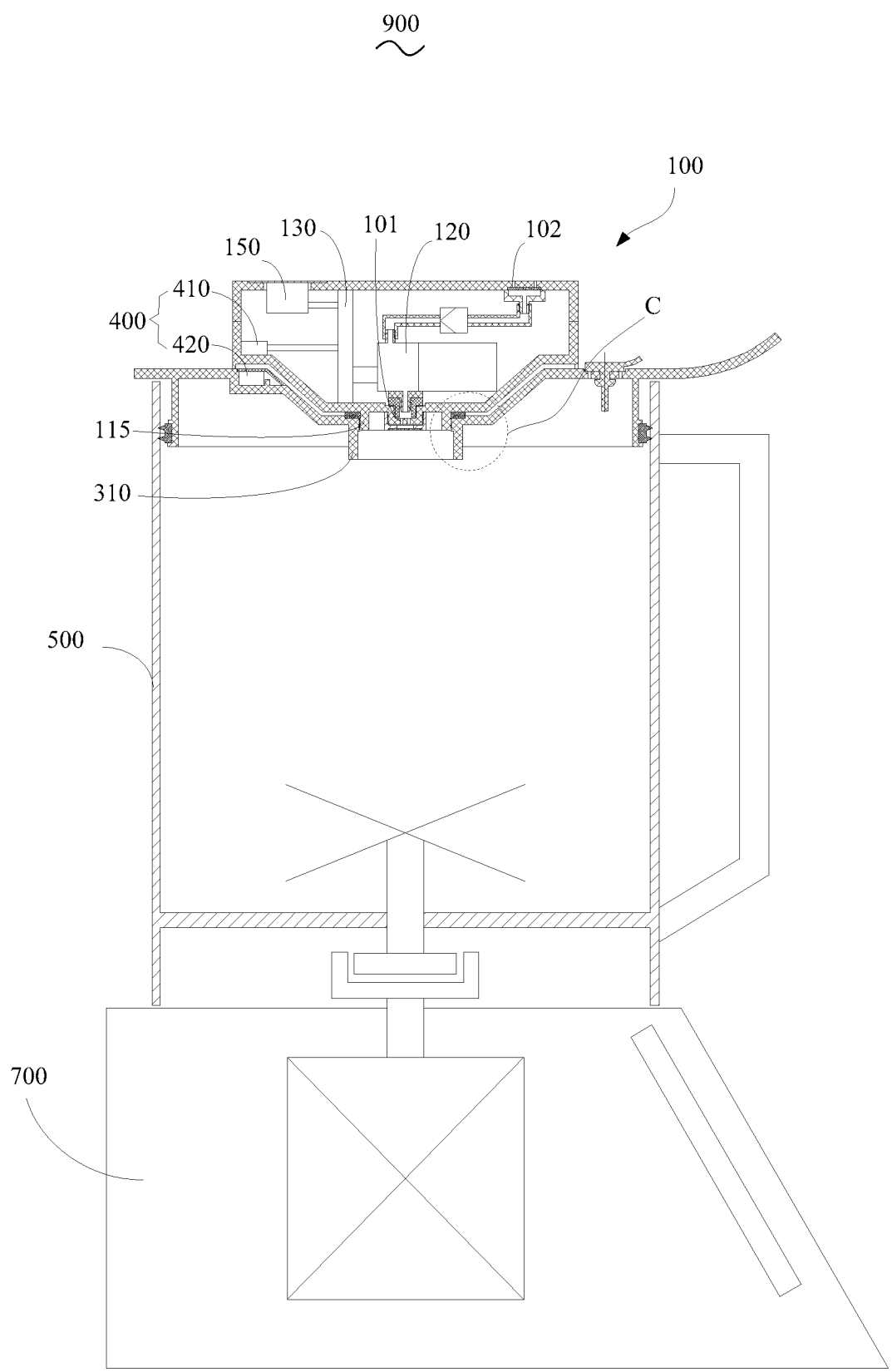
FIG. 11 is a schematic cross-sectional structural diagram of the food processor according to a fifth embodiment of the present disclosure.
Figure 12:
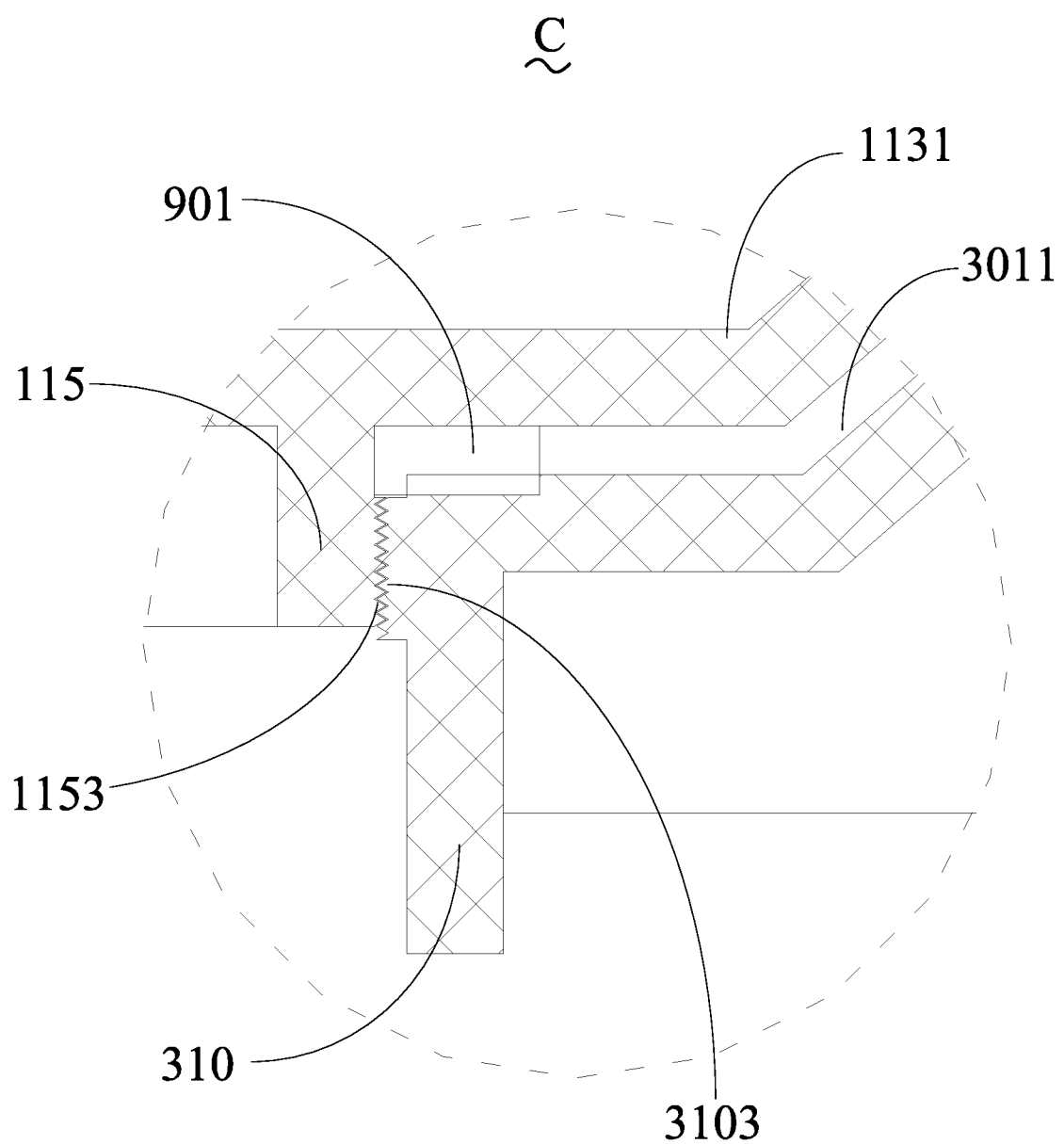
FIG. 12 is an enlarged schematic view at portion C in FIG. 11.

Referring to FIG. 11 and FIG. 12, in another embodiment of the detachable connection of the vacuum pumping device 100 and the cup cover 300, when the pumping opening 301 is provided on the bottom wall of the slot 3011, the screw structure includes an internal thread 3103 formed on the inner wall of the connection portion 310 of the cylindrical structure and an external thread 3103 formed on the outer wall of the sealing ring mounting portion 115 of the cylindrical structure. The sealing ring mounting portion 115 partially extends into the connecting portion 310 and is screwed to the connecting portion 310 through the cooperation of the internal thread 3103 and the external thread 1153. In the present disclosure, when the screw connection scheme is applied, the sealing structure of the vacuum pumping device 100 and the cup cover 300 should adopt an axial sealing method in which a sealing ring is provided between the outer wall of the insertion portion 1131 and the bottom wall of the slot 3011. The connection structure of the vacuum pumping device 100 and the cup cover 300 is a screw connection scheme, and the connection structure is relatively stable.

Figure 13:
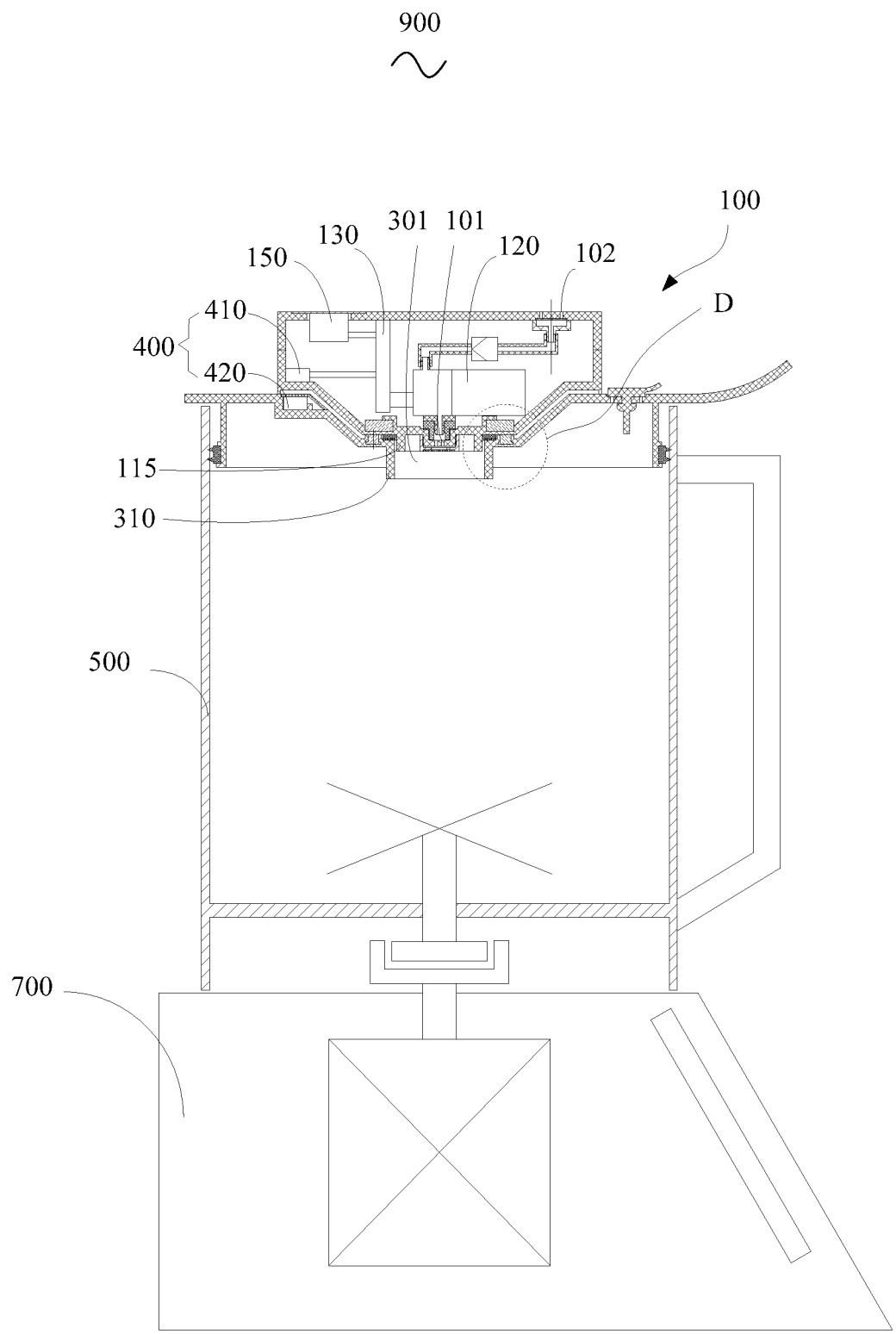
FIG. 13 is a schematic cross-sectional structural diagram of the food processor according to a sixth embodiment of the present disclosure.
Figure 14:
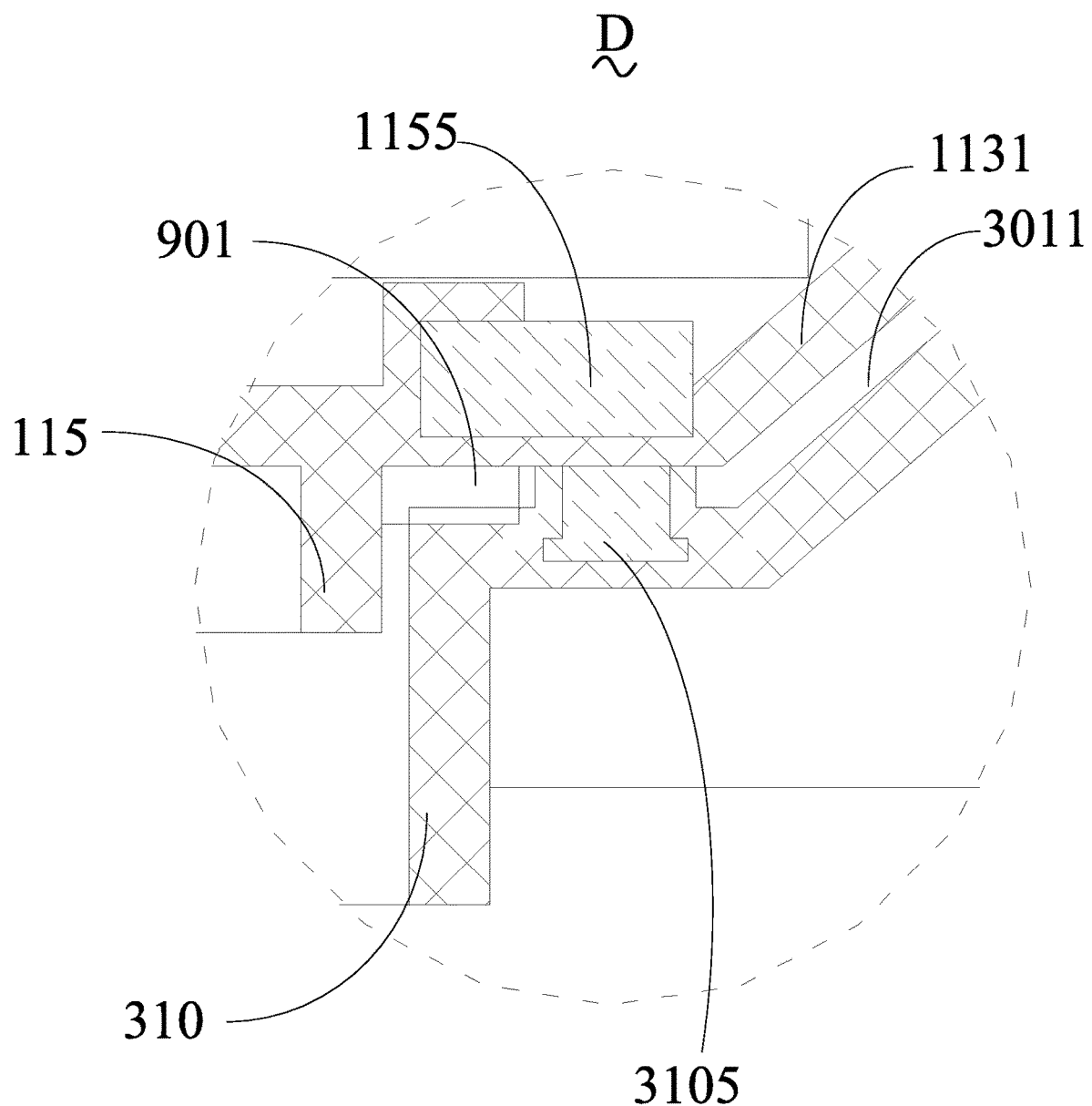
FIG. 14 is an enlarged schematic view at portion D in FIG. 13.

Referring to FIG. 13 and FIG. 14, in another embodiment of the detachable connection of the vacuum pumping device 100 and the cup cover 300, a magnetic connection structure can be provided between the vacuum pumping device 100 and the cup cover 300. The magnetic structure includes a first magnetic member 1155 fixed to the housing 110, and a second magnetic member 3105 fixed to the cup cover 300. The vacuum pumping device 100 magnetically attracts the cup cover 300 through the cooperation of the first magnetic member 1155 and the second magnetic member 3105. In order to achieve the firmness in the magnetic attraction process, the first magnetic member 1155 is fixed to the side wall of the housing 110 corresponding to the insertion portion 1131, and the second magnetic member 3105 is fixed to the side wall of the cup cover 300 corresponding to the slot 3011. Both the first magnetic member 1155 and the second magnetic member 3105 may be plate-shaped permanent magnets, or may be a combination of permanent magnets and metal plates that can be magnetized. The magnetic member can be embedded in the side wall during the manufacturing process of the cup cover 300 or the vacuum pumping device 100. By providing magnetic members at the insertion portion 1131 and the slot 3011, during the installation of the vacuum pumping device 100, the vacuum pumping device 100 can be snapped into the cup cover 300 along the guide of the slot 3011. The whole assembly process is more convenient. On this structure, the sealing structure between the vacuum pumping device 100 and the cup cover 300 can be any of the above.

After the vacuum pumping device 100 is mounted on the cup cover 300, the pumping power element 120 in the vacuum pumping device 100 is powered on to evacuate the cup body 500. Please referring to FIG. 8 again, the vacuum pumping device 100 further includes a first power supply structure 140 electrically connected to the pumping power element 120. The food processor 900 further includes a base 700, and the cup body 500 is mounted on the base 700. The base 700 is provided with a second power supply structure, and the first power supply structure 140 and the second power supply structure are independent of each other.

In the present disclosure, the vacuum pumping device 100 is provided with the first power supply structure 140. The first power supply structure 140 and the second power supply structure in the base 700 are independent of each other, which simplifies the circuit design of the electrical connection, simplifies the structure of the food processor 900, and also makes the vacuum pumping device 100 more portable and convenient to use.

The first power supply structure 140 of the present disclosure may be in various structural forms. In one embodiment, the first power supply structure 140 is provided with a power interface electrically connected to the pumping power element 120, and the power interface is fixedly connected to the housing 110. The power interface may be a USB interface or an existing terminal interface. During the process of using the vacuum pumping device 100, the vacuum pumping device 100 can be matched with the commercial power supply to supply power to the pumping power element 120, and can also be used to supply power to the pumping power element 120 by docking the mobile power supply currently on the market. After the end of use, it is only necessary to unplug the connector of the external power supply, so that the vacuum pumping device 100 is more convenient to carry and more convenient to use.

In another structural form of the first power supply structure 140, the first power supply structure 140 is an energy storage device received in the housing 110 and electrically connected to the pumping power element 120. The energy storage device can be a lithium battery or a dry battery. The dry battery can be a rechargeable dry battery or a non-rechargeable dry battery. The energy storage device is fixed in the housing 110 in the same way as the control circuit board 130. By setting the first power supply structure 140 as an energy storage device built into the housing 110, the vacuum pumping device 100 has a more complete function and is more convenient to use.

The first power supply structure 140 provides power for the control circuit board 130 and the pumping power element 120.

Before the food processor 900 of the present disclosure is started, in order to further ensure that the vacuum pumping device 100 is mounted in place on the cup cover 300 to ensure the sealing of the inner cavity of the cup body 500, please refer to FIGS. 9 to 11 again, a mounting detection structure 400 is further provided between the cup cover 300 and the vacuum pumping device 100, and the mounting detection structure 400 is configured to detect whether the vacuum pumping device 100 is mounted on the cup cover 300. The mounting detection structure 400 may be electrically connected to the control circuit board 130, and the mounting detection structure 400 may be designed to form a loop with the pumping power element 120 in series. When the mounting detection structure 400 is connected, the pumping power element 120 in the vacuum pumping device 100 is electrically connected to the first power supply structure 140, so that the pumping power element 120 can start to perform the vacuuming operation.

In the present disclosure, the mounting detection structure 400 is configured to detect whether the vacuum pumping device 100 is mounted on the cup cover 300, and after ensuring that the vacuum pumping device 100 is mounted on the cup cover 300, the vacuuming device 100 and the cup cover 300 are accurately matched, and the air tightness is guaranteed, which can prevent air leakage during the vacuuming process of the vacuum pumping device 100 and make the vacuuming process smooth.

In one embodiment, the mounting detection structure 400 includes a trigger switch 410 disposed on the vacuum pumping device 100, and a trigger member 420 corresponding to the trigger switch 410 and disposed on the cup cover 300. When the vacuum pumping device 100 is mounted in the cup cover 300, the trigger member 420 acts on the trigger switch 410, so that the trigger switch 410 is turned on.

The trigger switch 410 of the present disclosure may be a magnetic switch, and the trigger member 420 is the magnetic member, and the trigger member 420 causes the trigger switch 410 to be turned on through magnetic action.

In one embodiment, the trigger switch 410 is a micro switch, and the trigger member 420 is a protrusion formed on the surface of the cup cover 300. The trigger member 420 causes the trigger switch 410 to conduct through resisting action.

The trigger switch 410 may be fixed on the housing 110 of the vacuum pumping device 100 and connected in series with the pumping power element 120 to form a loop. The trigger member 420 is disposed on the surface of the cup cover 300 and is adjacent to the slot 3011 formed by the cup cover 300. After the insertion portion 1131 of the vacuum pumping device 100 is inserted into the slot 3011 of the cup cover 300 and the vacuum pumping device 100 and the cup cover 300 are connected, the trigger switch 410 and the trigger member 420 are connected to make the trigger switch 410 electrically conductive. The connection between the trigger switch 410 and the trigger member 420 may be that the protrusion touches the micro switch to turn on the micro switch, or the magnetic member magnetically acts on the magnetic switch to turn on the magnetic switch. Then, the pumping power element 120 can be started in the next step when the inner cavity of the cup body 500 is sealed, to ensure the smooth progress of the vacuuming.

The trigger switch 410 is disposed at the edge of the insertion portion 1131, and the trigger 420 is disposed at the edge of the slot 3011. The setting makes the mounting detection structure 400 more reasonable. When the insertion portion 1131 is completely inserted into the slot 3011, the mounting detection structure 400 is triggered, so that the detection is more accurate.

In the above contents, the trigger switch 410 can form a loop with the pumping power element 120, so that the mounting detection structure is used as a judgment input signal for the activation of the pumping power element 120. In other embodiments, the vacuum pumping device 100 further includes a prompting device (not shown) fixed to the housing 110, the prompting device is electrically connected to the trigger switch 410. When the trigger switch 410 is turned on, the prompting device sends a prompting message.

In one embodiment, the prompting device is a warning light or a buzzer fixed to the housing 120. That is, the food processor of the present disclosure can prompt the user by sound or light whether the vacuum pumping device 100 is mounted on the cup cover 300.

Figure 23:
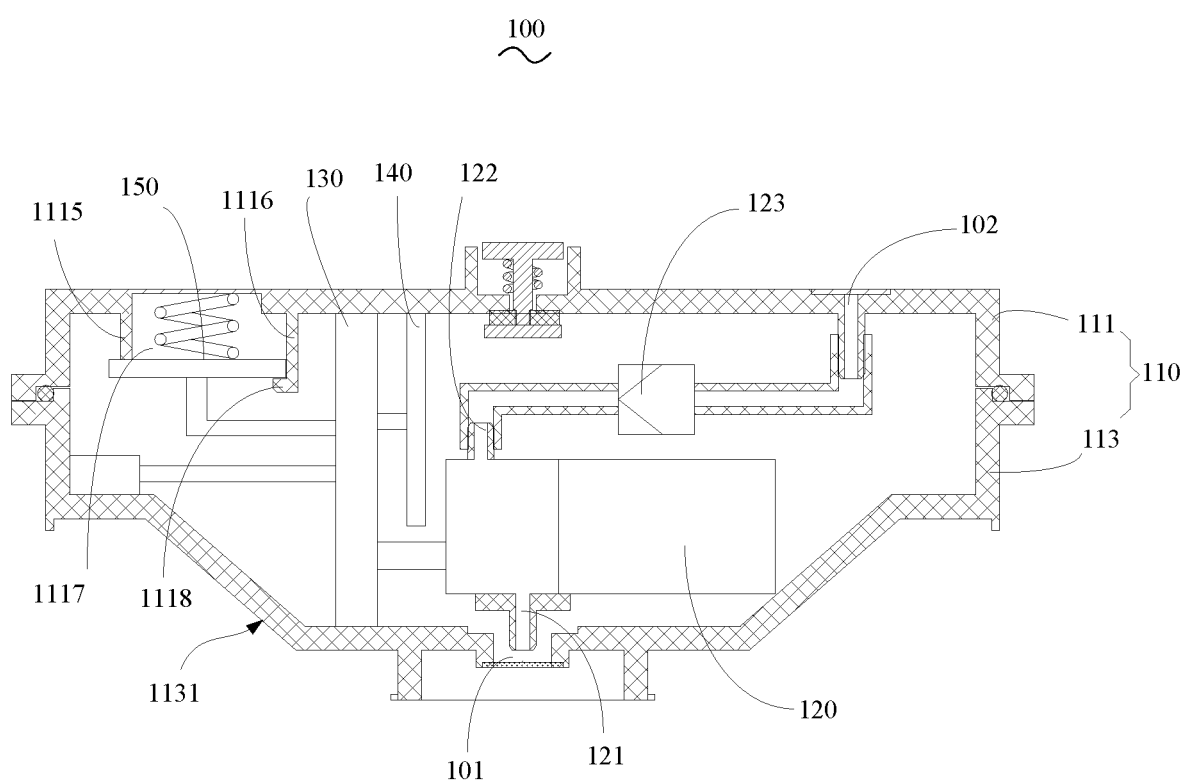
FIG. 23 is a schematic cross-sectional structural diagram of the vacuum pumping device of the food processor according to an eleventh embodiment of the present disclosure.

As can be seen from the above contents, in the present disclosure, the vacuum pumping device 100 and the base 700 of the food processor 900 are independent of each other, and the power supply structures of the two are independent of each other. In order to further improve the convenience of using the food processor 900, please refer to FIG. 23, the vacuum pumping device 100 of the present disclosure further includes a control circuit board 130 and a start switch 150 mounted on the housing 110. The control circuit board 130 receives the start signal of the start switch 150 and controls the pumping power element 120 to start.

In the present disclosure, a start switch 150 for controlling the start of the pumping power element 120 is provided on the vacuum pumping device 100. In this way, when the vacuum pumping device 100 performs the vacuuming operation on the food processor 900, the vacuum pumping device 100 can be independently started by operating the start switch 150. During the use of the food processor 900, the vacuum pumping device 100 can not only evacuate the ingredients before the ingredients of the food processor 900 are stirred, but also evacuate as needed during the stirring of the ingredients, which makes the food processor 900 more convenient in use.

In one embodiment, a switch fixing member 1115 and a switch limiting member 1116 are connected to the inner surface of the housing 110, and the switch fixing member 1115 and the switch limiting member 1116 extend into the receiving cavity. The switch fixing member 1115 and the switch limiting member 1116 are oppositely arranged and cooperate to form a switch mounting space 1117, and the start switch 150 is located in the switch mounting space 1117 and fixedly connected to the housing 110.

The switch fixing member 1115 and the switch limiting member 1116 are oppositely arranged and cooperate to form a switch mounting space 1117, so that the connection structure of the start switch 150 and the housing 110 is firm, and the start switch 150 is not easy to fall off the housing 110 when the start switch 150 is pressed.

Further, the free end of the switch limiting member 1116 is provided with a limiting portion 1118. The limiting portion 1118 stops the start switch 150 so that the start switch 150 is located in the switch mounting space 1117.

The limiting portion 1118 is in the shape of an inverted hook, which is provided at the end (that is, the free end) of the switch limiting member 1116 that is not connected to the housing 110. By providing the limiting portion 1118, when the start switch 150 is pressed, the start switch 150 is less likely to fall out of the switch mounting space 1117 in the axial direction in which it is deformed, so that the mounting structure of the start switch 150 is stronger.

In one embodiment, the start switch 140 is a micro switch or a touch switch. The vacuum pumping device 100 of the present disclosure is a touch mechanical start. Of course, in other embodiments, it may be further configured to be started remotely, that is, a signal receiver (not shown) is also provided in the vacuum pumping device 100 of the present disclosure. The signal receiver is electrically connected to the control circuit board 130, and the start switch 150 forms an electrical signal circuit with the pumping power element 120 and the control circuit board 130. The food processor 900 of the present disclosure is also provided with a remote controller that communicates with the signal receiver in the vacuum pumping device 100, and the remote controller can send a control signal to the receiver. The control circuit board 130 turns on the start switch 150 according to the signal, so that the pumping power element 120 turned on, so that the food processor can not only realize the mechanical touch and press start, but also realize the remote control start, making the use of the food processor 900 more convenient.

In order to further improve the convenience of using the food processor 900, the start switch 150 is connected to the side wall or the top wall of the housing 110. With such setting, the operation of touching and pressing the start switch 150 is more convenient.

Figure 20:
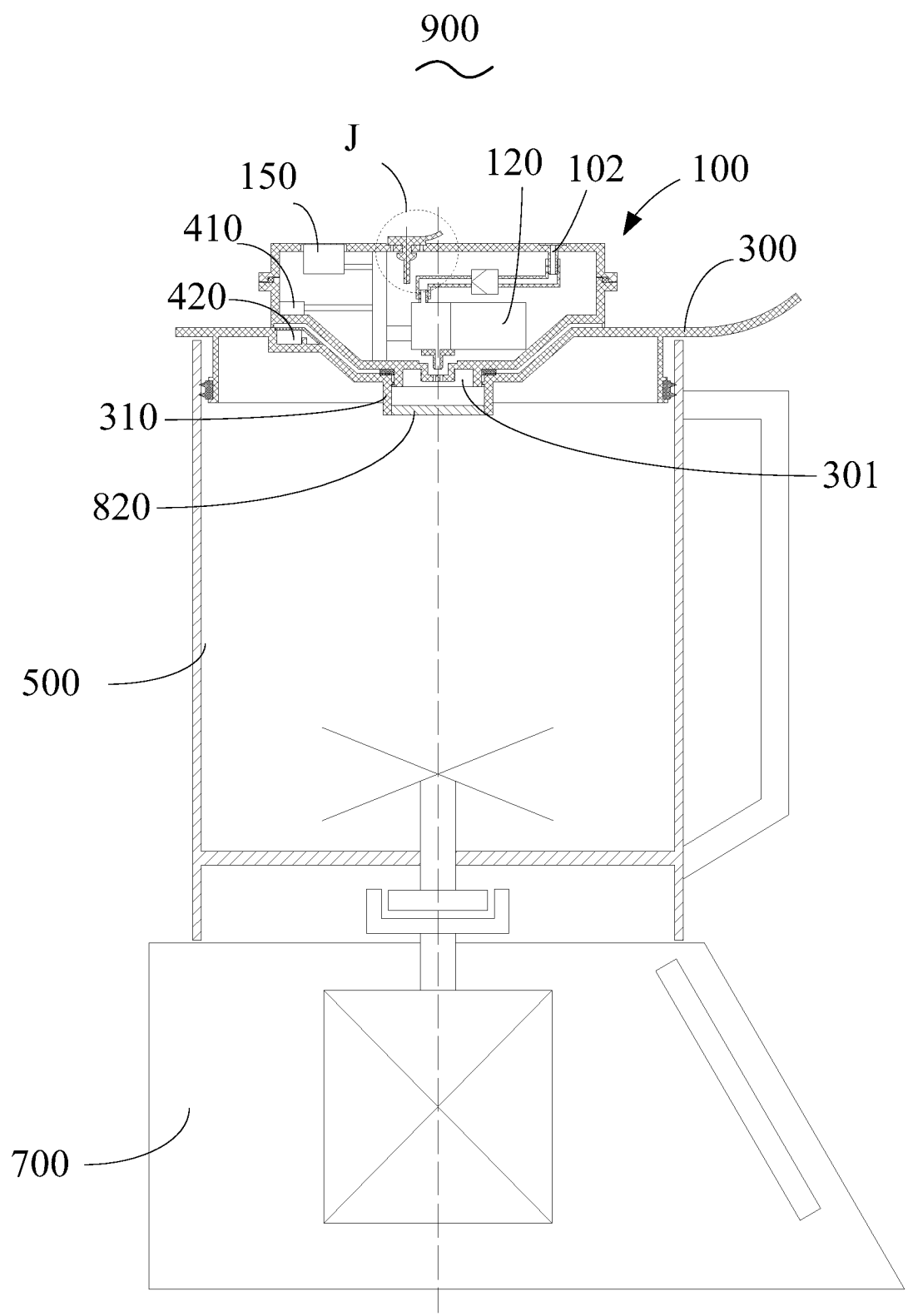
FIG. 20 is a schematic cross-sectional structural diagram of the food processor according to a ninth embodiment of the present disclosure.
Figure 22:
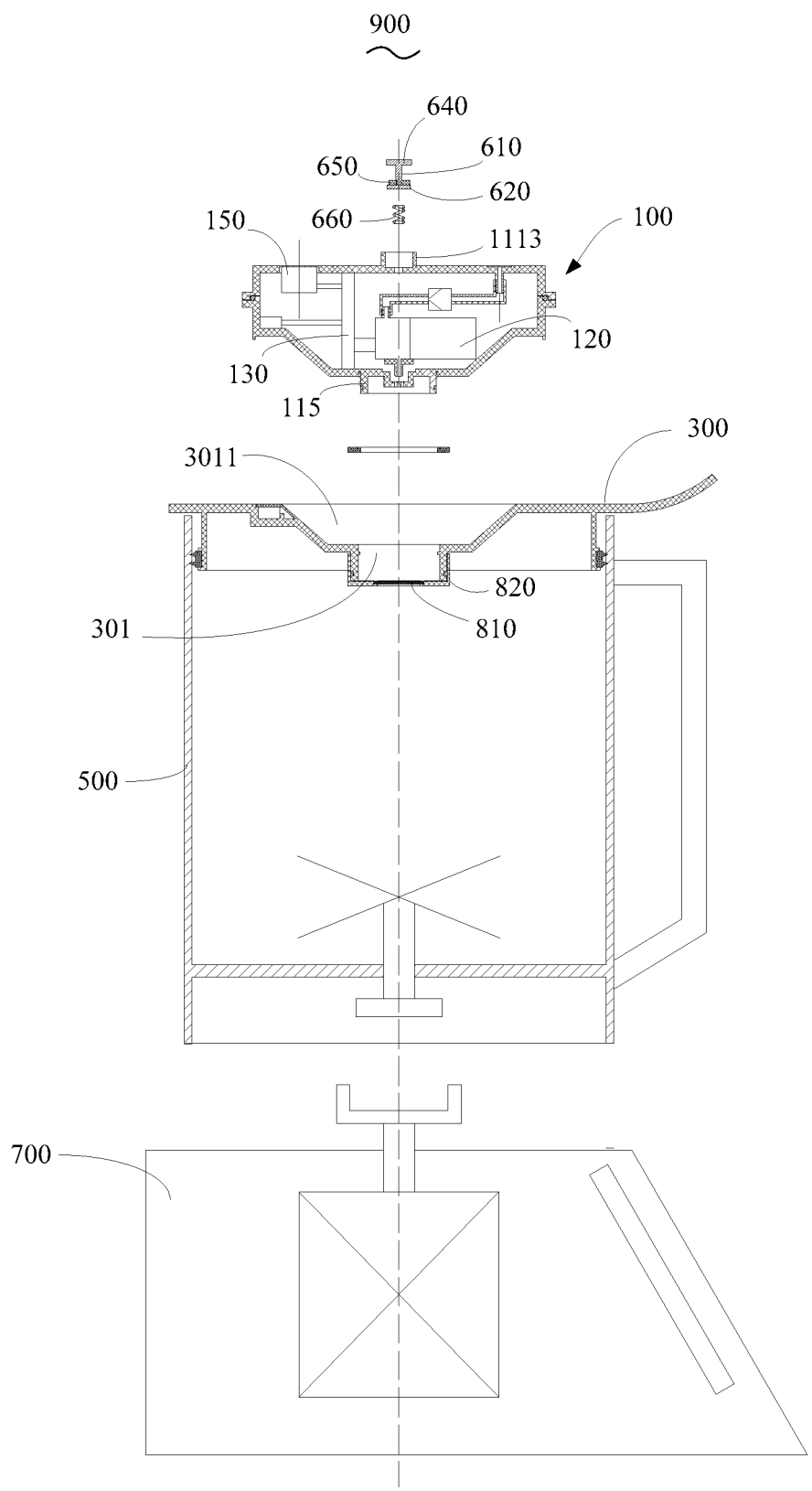
FIG. 22 is a schematic cross-sectional structural diagram of the food processor according to a tenth embodiment of the present disclosure.

Referring to FIGS. 15 to 20, in order to ensure the smooth pumping process of the food processor 900 of the present disclosure, to avoid the residue of the ingredients in the cup body 500 entering the pumping power element 120 during the pumping process, the pumping air path is blocked. The food processor 900 of the present disclosure is also provided with a waterproof and breathable structure (not shown). The waterproof and breathable structure is mounted on the cup cover 300 and covers the pumping opening 301 (as shown in FIGS. 20 and 22). In one embodiment, the waterproof and breathable structure is mounted in the vacuum pumping device 100 and covers the pumping hole 101 (see FIGS. 15 and 19).

In the present disclosure, the waterproof and breathable structure is provided on the cup cover 300 or in the vacuum pumping device 100. During the vacuuming process of the cup cover 300 by the vacuum pumping device 100, the waterproof and breathable structure can block the food residues in the cup body 500 from entering the pumping air path to damage the pumping power element 120 or block the pumping air path, thus ensuring the smooth vacuuming process of the vacuum pumping device 100.

In the present disclosure, the waterproof and breathable structure may be a waterproof and breathable membrane 820, or the waterproof and breathable structure includes a mounting cylinder 810 and a waterproof and breathable membrane 820, the mounting cylinder 810 is formed with passages through both ends of the mounting cylinder 810, and the waterproof and breathable membrane 820 is fixedly connected to the mounting cylinder 810 and covers the channel. The waterproof and breathable membrane 820 may be a mesh screen sheet 1200. The mounting cylinder 810 is a cylindrical structure. Specifically, when the waterproof and breathable structure is a separately provided waterproof and breathable membrane 820, the waterproof and breathable membrane 820 is fixedly connected to the cup cover 300 and covers the pumping opening 301; or, the waterproof and breathable membrane 820 is fixedly connected and sealed to the vacuum pumping device 100 and covers the pumping hole 101. When the waterproof and breathable membrane 820 is mounted in the vacuum pumping device 100, the waterproof and breathable membrane 820 is fixedly connected to the housing 110. When the waterproof and breathable membrane 820 is disposed on the cup cover 300, the waterproof and breathable membrane 820 may be fixedly connected to the cylindrical connection portion 310 on the cup cover 300 and seal the inner cavity of the cylindrical connection portion 310. When the waterproof and breathable structure is a matching structure of the mounting cylinder 810 and the waterproof and breathable membrane 820, in the present disclosure, a pumping nozzle may be protruded from the vacuum pumping device 100 at the pumping hole 101. That is, the pumping hole 101 is provided on the bottom wall of the pumping nozzle, and the mounting cylinder 810 is connected in a threaded manner with the pumping nozzle. When the waterproof and breathable structure is provided on the cup cover 300, an external thread 1153 may be provided on the outer wall of the connecting portion 310 of the cylindrical structure of the cup cover 300, and the end of the mounting cylinder 810 connected to the cup cover 300 is screwed to the connecting portion 310. That is, the housing 300 is formed with a pumping nozzle inside the sealing ring mounting portion 115, and the mounting cylinder 810 is sleeved on the outside of the pumping nozzle; or, the mounting cylinder 810 is sleeved on an end of the connecting portion 310 extending into the cup body 500.

In the present disclosure, when the waterproof and breathable structure is a separately provided waterproof and breathable membrane 820, the entire structure is simple and the cost is low. When the waterproof and breathable structure is a combined structure of the mounting cylinder 810 and the waterproof and breathable membrane 820, it is more convenient to disassemble and assemble.

After the food processor 900 is evacuated and the ingredients are stirred, the cup body 500 of the food processor 900 will be depressurized before opening the cup cover. Of course, in other cases, as long as the pressure relief operation is required, the pressure relief operation can also be performed. In the present disclosure, the following structural design can be carried out in solving the pressure relief method.

Figure 15:
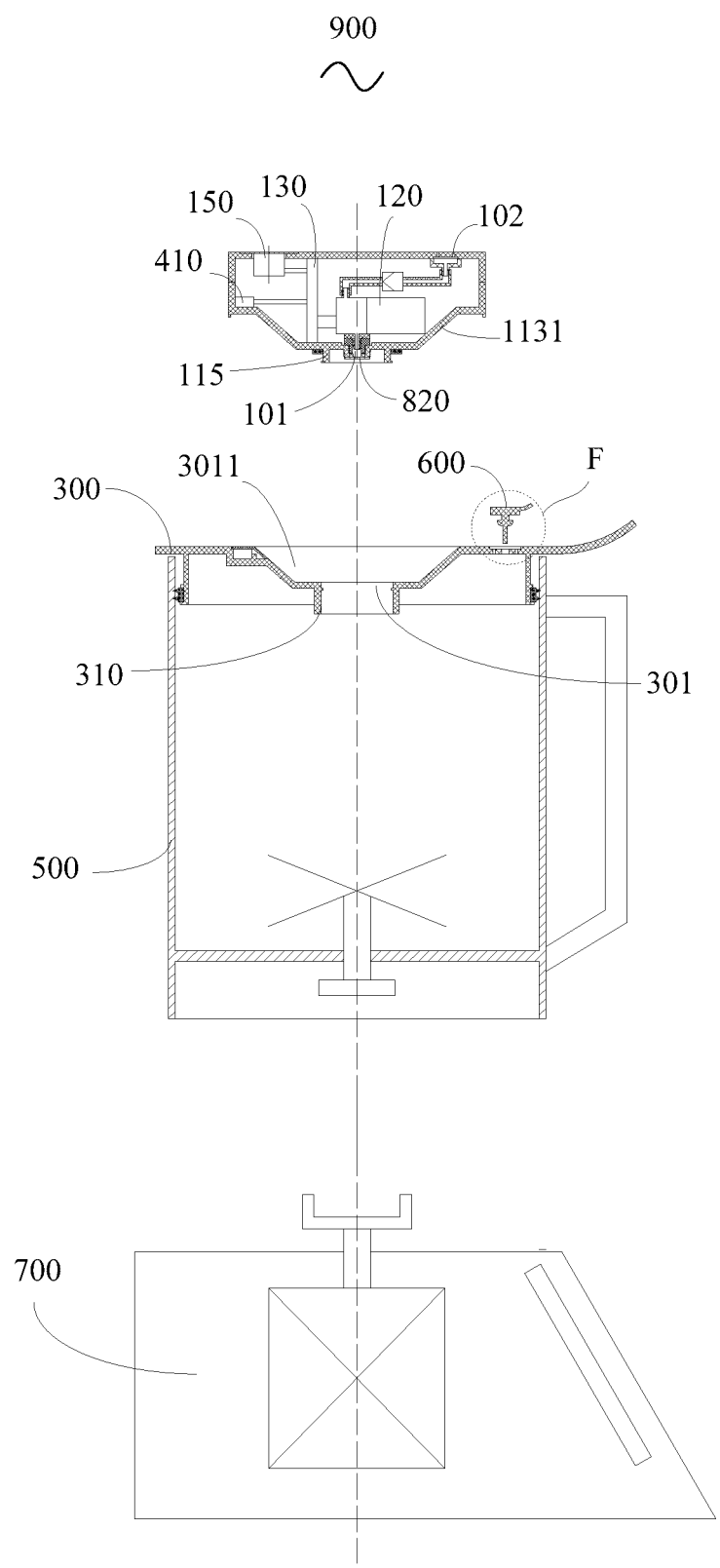
FIG. 15 is a schematic cross-sectional structural diagram of the food processor according to a seventh embodiment of the present disclosure.
Figure 16:
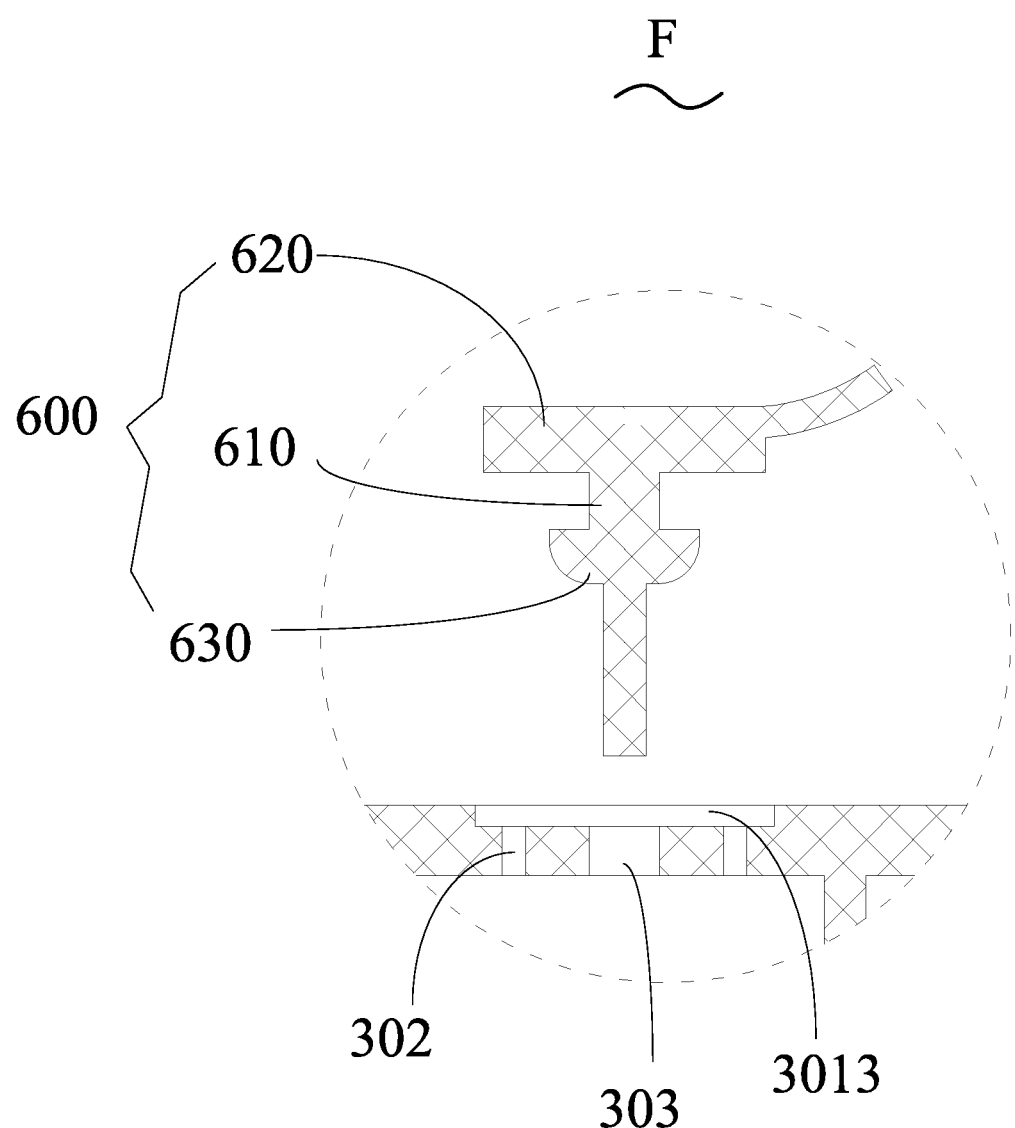
FIG. 16 is an enlarged schematic view at portion F in FIG. 15.

Referring to FIG. 15 and FIG. 16, in an embodiment of the pressure relief structure of the food processor 900, the cup cover 300 is also provided with a pressure relief hole 302 communicating with the inner cavity of the cup body 500. A pressure relief valve 600 for opening or closing the pressure relief hole 302 is also mounted at the pressure relief hole 302.

In the present embodiment, when the vacuum pumping device 100 vacuums the inside of the cup body 500, the pressure relief valve 600 closes the pressure relief hole 302, so that a closed cavity structure is formed in the cup body 500. When the cup cover 300 needs to be opened, the pressure relief hole 103 is opened by operating the pressure relief valve 600. The outside air enters the cup body 500 through the pressure relief hole 302 so that the pressure in the cup body 500 and the outside pressure are balanced, so that the operation of opening the cup cover 300 can proceed smoothly. In order to facilitate the pressure relief operation, the pressure relief valve 600 installed in the cup cover 300 is located at the edge of the cup cover 300 and is spaced from the slot 3011. That is, after the vacuum pumping device 100 is installed on the cup cover 300, the housing 110 of the vacuum pumping device 100 will not touch the pressure relief valve 600. In one embodiment, there is an interval between the pressure relief valve 600 and the housing 110 of the vacuum pumping device 100, for example, a one-centimeter interval. In this way, after the evacuation of the vacuum pumping device 100 is completed, it is easier for the operator to operate the pressure relief valve 600 to open the pressure relief hole 302.

It should be noted that in the above, we have introduced the case where there are multiple pumping gas paths in the vacuum pumping device 100. When the pressure relief valve 600 is provided in the cup cover 300, the first to fourth types of pumping gas paths in the vacuum pumping device 100 are applicable.

In the present disclosure, by providing a pressure relief valve 600 on the cup cover 300, when a pressure relief operation is required, the pressure relief gas path is shorter, the pressure relief operation is faster, and the structure is relatively simple.

In the present disclosure, the specific structure of the pressure relief valve 600 on the cup cover 300 can be divided into two structural forms.

Referring to FIG. 15 and FIG. 16 again, in the first structural form of the pressure relief valve 600, the pressure relief valve 600 includes a pressure relief valve mounting portion 610, a valve wing 620 connected to one end of the pressure relief valve mounting portion 610, and a pressure relief valve fixing portion 630 connected to the other end of the pressure relief valve mounting portion 610. The cup cover 300 further includes a mounting hole 303 adjacent to the pressure relief hole 302, the pressure relief valve mounting portion 610 slides through the mounting hole 303, the valve wing 620 is located outside the cup cover 300, the pressure relief valve fixing portion 630 is located inside the cup cover 300, the pressure relief valve 600 is configured to slide relative to the mounting hole 303 to allow the valve wing 620 to open or close the pressure relief hole 302, and the pressure relief valve fixing portion 630 is stopped by an inner wall of the cup cover 300 after the valve wing 620 is away from the pressure relief hole 302 and configured to open the pressure relief hole 302.

In the present embodiment, under the action of the suction force of the pumping power element 120, the pressure relief valve 600 relatively slides between the pressure relief valve mounting portion 610 and the pressure relief hole 302, and the valve wing 620 is near the pressure relief hole 302 to close the pressure relief hole 302. However, when a pressure relief operation is required, by pulling the pressure relief valve 600 to make the valve wing 620 move away from the cup cover 300 to open the pressure relief hole 302, the first structure of the pressure relief valve 600 is relatively simple.

In the present embodiment, the mounting hole 303 is in a ring shape, and the pressure relief hole 302 surrounds the periphery of the mounting hole 303. The mounting hole 303 is located in the center of the ring formed by the pressure relief hole 302, to ensure that the pressure relief valve 600 is evenly stressed when the pressure relief hole 302 slides relative to the mounting hole 303 to open or close the pressure relief hole 302. In addition, the movement is a linear movement away from or close to the cup cover 300, which facilitates opening and closing operations, and the airtightness of the pressure relief valve 600 to close the pressure relief hole 302 is also high.

In order to further improve the airtightness of the pressure relief valve 600 when closing the pressure relief hole 302, the outer wall of the cup cover 300 is also concavely provided with a limiting groove 3013, and the pressure relief hole 302 penetrates the bottom wall of the limiting groove 3013. When the valve wing 620 approaches and closes the pressure relief hole 302, the valve wing 620 is fitted into the limiting groove 3013.

Figure 17:
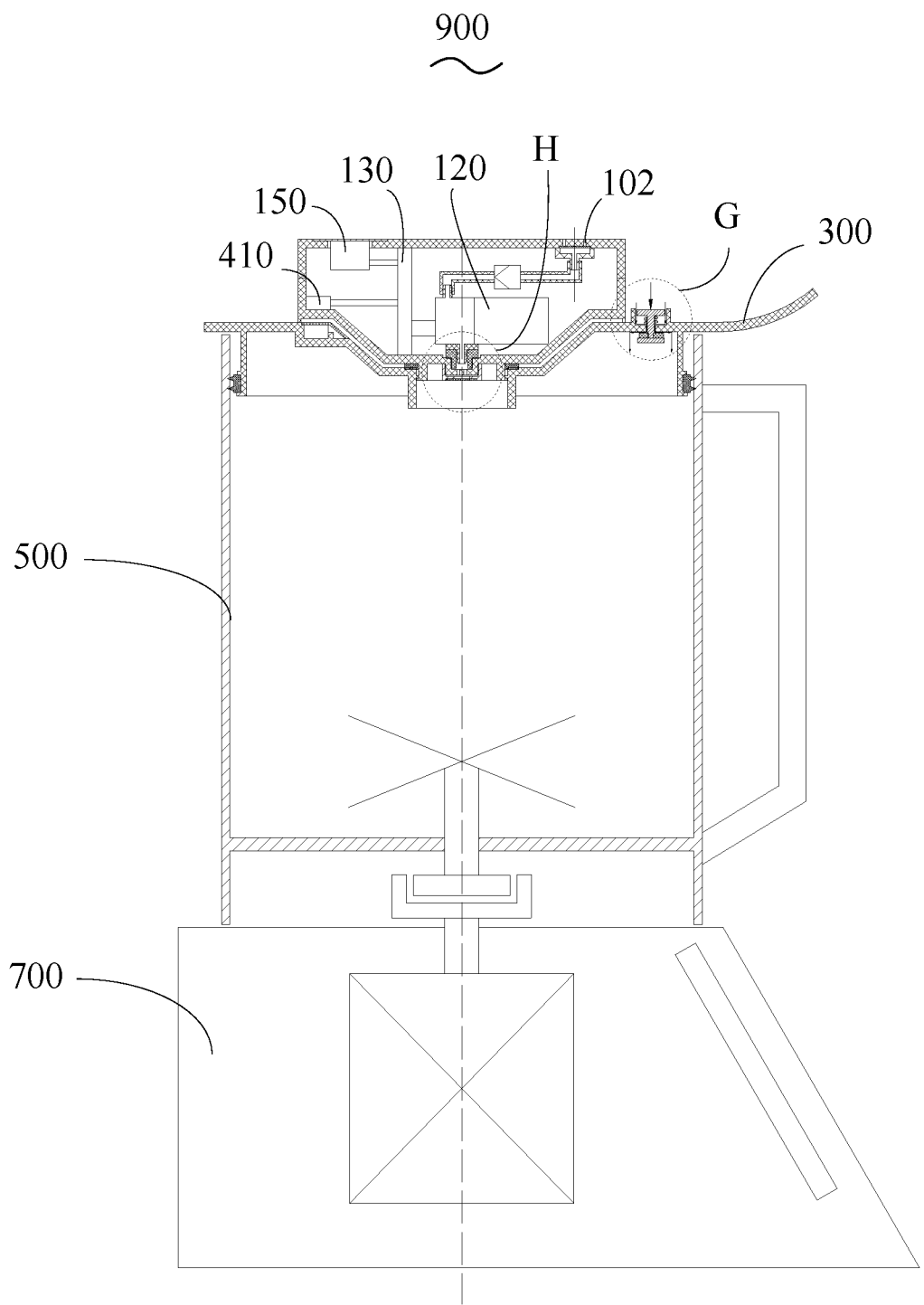
FIG. 17 is a schematic cross-sectional structural diagram of the food processor according to an eighth embodiment of the present disclosure.
Figure 18:
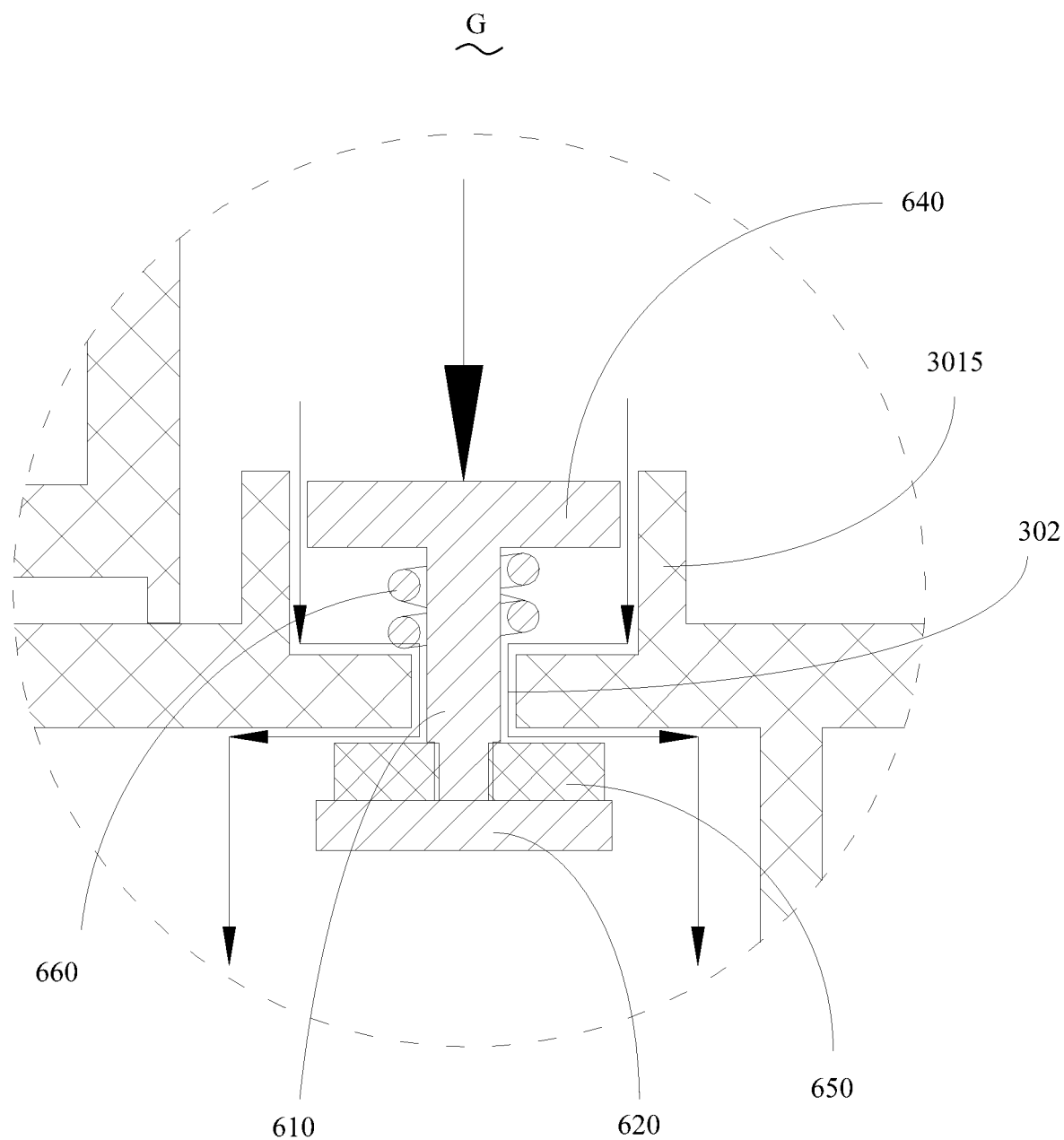
FIG. 18 is an enlarged schematic view at portion G in FIG. 17.
Figure 19:
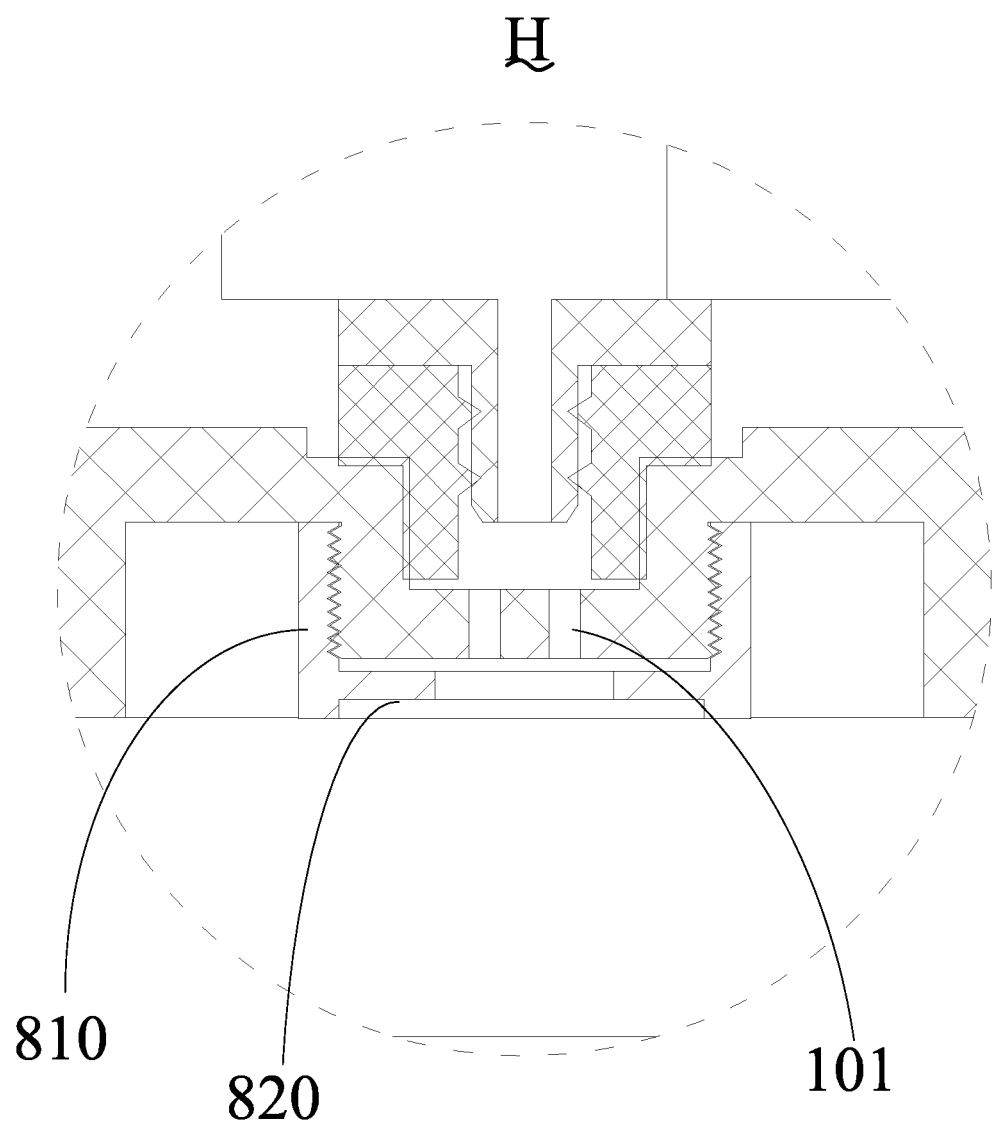
FIG. 19 is an enlarged schematic view at portion H in FIG. 17.

Referring to FIG. 17 and FIG. 18, in the second structural form of the pressure relief valve 600, the pressure relief valve 600 includes a pressure relief valve mounting portion 610, a pressing portion 640 connected to one end of the pressure relief valve mounting portion 610, and a valve wing 620 connected to the other end of the pressure relief valve mounting portion 610. The pressure relief valve mounting portion 610 slides through the mounting hole 302. The diameter of the pressure relief hole 302 is larger than the outer diameter of the pressure relief valve mounting portion 610. The pressing portion 640 is located outside the cup cover 300. The valve wing 620 is located inside the cup cover 300. The pressure relief valve mounting portion 610 is further sleeved with an elastic member 660, one end of the elastic member 660 abuts on the pressing portion 640, and the other end of the elastic member 660 abuts on the cup cover 300, the elastic member 660 provides an elastic force to drive the valve wing 620 to abut on the inner surface of the cup cover 300 and cover the pressure relief hole 302, and under an external force, the valve wing 620 is away from the pressure relief hole 302 and configured to open the pressure relief hole 302.

In the present disclosure, the second structure of the pressure relief valve 600 is configured as an elastic pressure relief valve 600 structure. During the pressure relief operation, it is only necessary to press the pressing portion 640, and the pressure relief operation is more convenient.

Further, in the present embodiment, a sealing gasket 650 is also mounted on the side of the valve wing 620 towards the cup cover 300. The sealing gasket 650 may be made of a silicone material, which may be integrally formed on the valve wing 620. When the pressure relief valve 600 closes the pressure relief hole 302, the sealing gasket 650 covers the pressure relief hole 302, and the tightness of the sealing process can be further improved by the setting of the sealing gasket 650.

Further, in the present embodiment, the outer surface of the cup cover 300 is also provided with a limiting cylinder 3015, and the limiting cylinder 1113 surrounds the periphery of the valve wing 620. The setting of the limit cylinder 3015 can improve the smoothness of the process when the pressure relief valve 600 is pressed.

Figure 21:
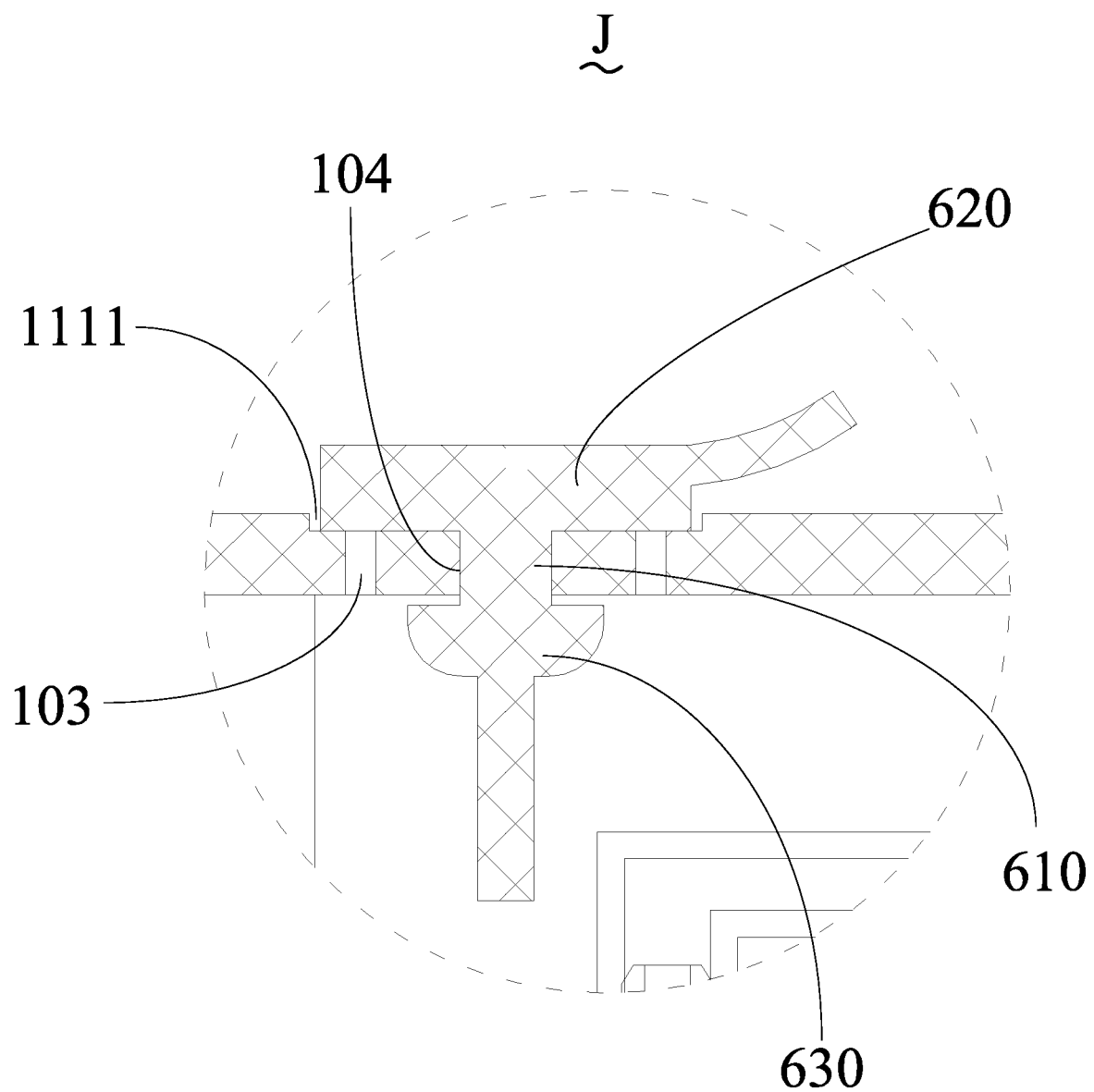
FIG. 21 is an enlarged schematic view at portion J in FIG. 20.

The above describes the case where the pressure relief valve 600 is provided in the cup cover 300. Referring to FIG. 20 to FIG. 22, in another embodiment of the pressure relief structure of the food processor 900, the vacuum pumping device 100 is provided with a pumping air path and a pressure relief air path. The vacuum pumping device 100 is also installed with a pressure relief valve 600 that opens or closes the pressure relief air path. The food processor 900 has a first use state and a second use state. In the first use state, the pumping air path communicates with the pumping opening 301 to vacuums the inner cavity of the cup boy 500. In the second use state, the pressure relief valve 600 opens the pressure relief air path so that the pressure relief air path communicates with the pumping opening 301 to perform pressure relief processing on the inner cavity of the cup body 500.

In the present disclosure, the pumping air path of the vacuum pumping device 100 can be selected when the housing 110 of the vacuum pumping device 100 forms a sealed cavity, that is, the first and second types of pumping air paths of the vacuum pumping device 100 can be selected from the above.

Embodiments of the present disclosure, the vacuum pumping device 100 is detachably mounted on the food processor 900, and the vacuum pumping device 100 is provided with a pumping air path and a pressure relief air path. When the food processor 900 needs to be evacuated, the pumping air path leads to the inner cavity of the cup body 500. When a pressure relief operation is required, the pressure relief valve 600 opens the pressure relief air path so that the pressure relief air path communicates with the pumping opening 301 of the cup cover 300. In this way, the food processor 900 is prevented from being oxidized by the action of the ingredients and the air during the stirring process, and the food ingredient processing effect of the food processor 900 is improved.

In one embodiment, a closed receiving cavity is formed on the housing 110, the housing 110 is also provided with a pumping hole 102. The pumping hole 101 and the pressure relief hole 103 both are configured to communicate with the receiving cavity, an air inlet 121 of the pumping power element 120 is configured to communicate with the receiving cavity, the exhaust hole 102 is configured to communicate with an air outlet of the pumping power element 120 through a pipeline, and the pumping hole 101 is configured to communicate with the pumping opening 301 after the vacuum pumping device 100 is mounted on the cup cover 300.

The pumping hole 101, the receiving cavity, and the pressure relief hole 103 communicate with each other to form a pressure relief air path. The pumping hole 101, the receiving cavity, the pumping power element 120, and the exhaust hole 102 communicate with each other to form a pumping air path.

In the present disclosure, when the pressure relief valve 600 is provided on the vacuum pumping device 100, the specific structure of the pressure relief valve 600 can also be divided into two structural forms.

Referring to FIG. 20 and FIG. 21 again, in the first structural form of the pressure relief valve 600, the pressure relief valve 600 includes a pressure relief valve mounting portion 610, a valve wing 620 connected to one end of the pressure relief valve mounting portion 610, and a pressure relief valve fixing portion 630 connected to the other end of the pressure relief valve mounting portion 610. The cup cover 300 further includes a mounting hole 104 adjacent to the pressure relief hole 103, the pressure relief valve mounting portion 610 slides through the mounting hole 104, the valve wing 620 is located outside the cup cover 300, the pressure relief valve fixing portion 630 is located inside the cup cover 300, the pressure relief valve 600 is configured to slide relative to the mounting hole 104 to allow the valve wing 620 to open or close the pressure relief hole 103, and the pressure relief valve fixing portion 630 is stopped by an inner wall of the cup cover 300 after the valve wing 620 is away from the pressure relief hole 103 and configured to open the pressure relief hole 103.

In the present embodiment, under the action of the suction force of the pumping power element 120, the pressure relief valve 600 relatively slides between the pressure relief valve mounting portion 610 and the pressure relief hole 103, and the valve wing 620 is near the pressure relief hole 103 to close the pressure relief hole 103. However, when a pressure relief operation is required, by pulling the pressure relief valve 600 to make the valve wing 620 move away from the cup cover 300 to open the pressure relief hole 103, the first structure of the pressure relief valve 600 is relatively simple.

In the present embodiment, the mounting hole 104 is in a ring shape, and the pressure relief hole 103 surrounds the periphery of the mounting hole 104. The mounting hole 104 is located in the center of the ring formed by the pressure relief hole 103, to ensure that the pressure relief valve 600 is evenly stressed when the pressure relief hole 103 slides relative to the mounting hole 104 to open or close the pressure relief hole 103. In addition, the movement is a linear movement away from or close to the cup cover 300, which facilitates opening and closing operations, and the airtightness of the pressure relief valve 600 to close the pressure relief hole 103 is also high.

In order to further improve the airtightness of the pressure relief valve 600 when closing the pressure relief hole 103, the outer wall of the cup cover 300 is also concavely provided with a limiting groove 1111, and the pressure relief hole 103 penetrates the bottom wall of the limiting groove 1111. When the valve wing 620 approaches and closes the pressure relief hole 103, the valve wing 620 is fitted into the limiting groove 1111.

Referring to FIG. 22, in the second structural form of the pressure relief valve 600, the pressure relief valve 600 includes a pressure relief valve mounting portion 610, a pressing portion 640 connected to one end of the pressure relief valve mounting portion 610, and a valve wing 620 connected to the other end of the pressure relief valve mounting portion 610. The pressure relief valve mounting portion 610 slides through the pressure relief hole 103. The pressing portion 640 is located outside the cup cover 300. The valve wing 620 is located inside the cup cover 300. The pressure relief valve mounting portion 610 is further sleeved with an elastic member 660, one end of the elastic member 660 abuts on the pressing portion 640, and the other end of the elastic member 660 abuts on the cup cover 300, the elastic member 660 provides an elastic force to drive the valve wing 620 to abut on the inner surface of the cup cover 300 and cover the pressure relief hole 103, and under an external force, the valve wing 620 is away from the pressure relief hole 103 and configured to open the pressure relief hole 103.

In the present disclosure, the second structure of the pressure relief valve 600 is configured as an elastic pressure relief valve 600 structure. During the pressure relief operation, it is only necessary to press the pressing portion 640, and the pressure relief operation is more convenient.

Further, in the present embodiment, a sealing gasket 650 is also mounted on the side of the valve wing 620 towards the cup cover 300. The sealing gasket 650 may be made of a silicone material, which may be integrally formed on the valve wing 620. When the pressure relief valve 600 closes the pressure relief hole 103, the sealing gasket 650 covers the pressure relief hole 103, and the tightness of the sealing process can be further improved by the setting of the sealing gasket 650.

Further, in the present embodiment, the outer surface of the cup cover 300 is also provided with a limiting cylinder 1113, and the limiting cylinder 1113 surrounds the periphery of the valve wing 620. The setting of the limiting cylinder 1113 can improve the smoothness of the process when the pressure relief valve 600 is pressed.

Further, in order to realize that the food processor of the present disclosure can automatically stop the operation of the vacuum pumping device after the vacuum degree reaches a preset value, the vacuum pumping device further includes a detection module (not shown). In some feasible embodiments, the detection module is a current detection module, and the current detection module is connected in series on the circuit between the control circuit board 130 and the pumping power element 120 to detect the current of the pumping power element 120 during operation.

In the present disclosure, the detection module is a current detection module, which may specifically be an ammeter or a current sensor. The detection module is received in the receiving cavity. The detection module is connected in series on the circuit between the control circuit board 130 and the pumping power element 53 to detect the current of the pumping power element 53 during operation. In other embodiments, the detection module may also be replaced by a voltage detection module. Since the pumping power element 53 extracts the air in the cavity of the cup body 500, the amount of air in the cavity of the cup body 500 gradually decreases, therefore, the current of the pumping power element 53 gradually increases during the vacuuming process, and the rate of current increase gradually decreases until the trend of the current increase approaches zero at the end. At this time, it is necessary to control the pumping power element 120 to stop running, to protect the vacuum pumping device 50 and prevent the vacuum pumping device 100 from burning out, improving the safety and operating reliability of the vacuum pumping device.

Further, in some feasible embodiments, the detection module is an air pressure detection module, and the air pressure detection module is electrically or wirelessly connected to the control circuit board 130 to detect the suction pressure of the pumping power element 120.

Further, the air pressure detection module is a pressure sensor, and the pressure sensor is disposed between the air inlet 121 and the pumping hole 512 to detect the suction pressure of the pumping power element 120 during operation.

In the present disclosure, the detection module is an air pressure detection module, which may specifically be a pressure sensor or an air pressure detection meter, and the air pressure detection module is received in the receiving cavity. The air pressure detection module is provided at the air inlet 121 of the pumping power element 120, and is electrically or wirelessly connected to the control circuit board 130, and is mainly used to detect the suction pressure of the pumping power element 53 during operation. Since the pumping power element 53 extracts the air in the cavity of the cup body 500, the amount of air in the cavity of the cup body 500 gradually decreases, therefore, the air pressure of the pumping power element 53 gradually increases during the vacuuming process, and the rate of air pressure increase gradually decreases until the trend of the air pressure increase approaches zero at the end. At this time, it is necessary to control the pumping power element 120 to stop running, to protect the vacuum pumping device 50 and prevent the vacuum pumping device 100 from burning out, improving the safety and operating reliability of the vacuum pumping device.

Further, in some feasible embodiments, the detection module is a timer, and the timer is electrically connected to the control circuit board 130 to record the running time of the pumping power element 120.

In the present embodiment, the detection module is the timer, and the timer is received in the receiving cavity formed by the housing 110. The timer is electrically connected to the control circuit board 130, or the timer is electrically connected to the pumping power element 120, or the timer is connected in series on the current loop between the control circuit board 130 and the pumping power element 53. The timer starts counting when the control circuit board 130 inputs current to the pumping power element 120, and when the control circuit board 130 stops inputting current to the pumping power element 53, the timer stops counting, and then records the running time of the pumping power element 120. The running time is related to the volume V of the inner cavity of the cup body 500 and the pumping flow rate v of the pumping power element 53, which is generally 30 seconds to 120 seconds, in one embodiment 90 seconds. When performing fuzzy control on the vacuum pumping device 50, the vacuum pumping device 50 may be stopped after 90 seconds of starting operation to ensure the safety and reliability of the vacuum pumping device 50.

What is claimed is:
1. A food processor, comprising:
   a cup body;
   a cup cover detachably connected to an upper end of the cup body, the cup cover comprising a pumping opening in communication with an inner cavity of the cup body, and being provided with a cover handle; and
   a vacuum pumping device detachably connected to the cup cover, the vacuum pumping device comprising a pumping hole and an exhaust hole, the pumping hole being configured to communicate with the pumping opening after the vacuum pumping device is mounted on the cup cover;

wherein the cup cover is concavely formed with a slot, the vacuum pumping device comprises a housing and a pumping power element provided in the housing, the housing is provided with an insertion portion embedded in the slot, and the pumping power element is at least partially provided in the insertion portion.

2. The food processor of claim 1, wherein food processor further comprises a waterproof and breathable structure configured to block food residues and liquid in the cup body from entering the vacuum pumping device;

wherein:
the pumping opening is defined on a bottom wall of the slot, and the pumping hole is provided in the insertion portion;
the pumping opening is lower than an upper edge of the cup body; and
the pumping opening is located in a middle of the cup cover.

3. The food processor of claim 2, wherein a shape of a vertical section of the slot is trapezoidal or square, and an external contour shape of the insertion portion is adapted to the shape of the vertical section of the slot.

4. The food processor of claim 3, wherein a depth of the slot is a dimension of the slot extending in an axial direction of the cup body, and the depth of the slot is 5 mm to 50 mm.

5. The food processor of claim 2, wherein the vacuum pumping device further comprises a first power supply structure, the pumping power element is electrically connected to the first power supply structure, the food processor further comprises a base, the cup body is mounted on the base, the base is provided with a second power supply structure, and the first power supply structure and the second power supply structure are independent of each other.

6. The food processor of claim 2, wherein a clamping slot is formed on an outer wall of the housing, the clamping slot is configured to surround the insertion portion, a first sealing ring is mounted in the clamping slot, and the first sealing ring is clamped by the vacuum pumping device and the cup cover after the vacuum pumping device is mounted on the cup cover.

7. The food processor of claim 2, wherein the cup cover is connected with a connecting portion at a periphery of the pumping opening, the connecting portion is configured to extend towards the inner cavity of the cup body, the vacuum pumping device protrudes from a sealing ring mounting portion at an outer wall of the insertion portion, the pumping hole is located inside the sealing ring mounting portion, the sealing ring mounting portion is configured to partially extend into the connecting portion and is connected to the connecting portion, a first sealing ring is sleeved outside the sealing ring mounting portion, and the first sealing ring is clamped by the vacuum pumping device and the cup cover after the vacuum pumping device is mounted on the cup cover.

8. The food processor of claim 7, wherein the first sealing ring is clamped between the outer wall of the insertion portion and the bottom wall of the slot.

9. The food processor of claim 7, wherein:
both the sealing ring mounting portion and the connecting portion are cylindrical;
the first sealing ring is clamped between the sealing ring mounting portion and the connecting portion; or
the first sealing ring comprises a first sealing portion and a second sealing portion connected to the first sealing portion, the first sealing portion is clamped between the insertion portion and the bottom wall of the slot, and the second sealing portion is clamped between the sealing ring mounting portion and the connecting portion.

10. The food processor of claim 2, wherein the cup cover is further provided with a connecting ring, the connecting ring is configured to surround the slot and extend towards the inner cavity of the cup body, an annular groove is formed on an outer wall of the connecting ring, a second sealing ring is embedded in the annular groove, and the second sealing ring is configured to abut on an inner wall of the cup body.

11. The food processor of claim 1, wherein the cup cover is further provided with a pressure relief hole communicating with the inner cavity of the cup body, and the cup cover is also provided with a pressure relief valve configured to open or close the pressure relief hole at the pressure relief hole.

12. The food processor of claim 11, wherein the pressure relief valve comprises a pressure relief valve mounting portion, a valve wing connected to a first end of the pressure relief valve mounting portion, and a pressure relief valve fixing portion connected to a second end of the pressure relief valve mounting portion, the cup cover further comprises a mounting hole adjacent to the pressure relief hole, the pressure relief valve mounting portion is configured to slide through the mounting hole, the valve wing is located outside the cup cover, the pressure relief valve fixing portion is located inside the cup cover, the pressure relief valve is configured to slide relative to the mounting hole to allow the valve wing to open or close the pressure relief hole, and the pressure relief valve fixing portion is stopped by an inner wall of the cup cover after the valve wing is away from the pressure relief hole and configured to open the pressure relief hole.

13. The food processor of claim 11, wherein the pressure relief valve comprises a pressure relief valve mounting portion, a pressing portion connected to a first end of the pressure relief valve mounting portion, and a valve wing connected to a second end of the pressure relief valve mounting portion, the pressure relief valve mounting portion is configured to slide through a mounting hole, the pressing portion is located outside the cup cover, the valve wing is located inside the cup cover; and the pressure relief valve mounting portion is further sleeved with an elastic member, a first end of the elastic member is configured to abut on the pressing portion, and a second end of the elastic member is configured to abut on the cup cover, the elastic member provides an elastic force to drive the valve wing to abut on the inner surface of the cup cover and cover the pressure relief hole, and under an external force, the valve wing is away from the pressure relief hole and configured to open the pressure relief hole.

14. The food processor of claim 1, wherein a closed receiving cavity is formed on the housing, the pumping power element is received in the closed receiving cavity, the housing is provided with a pumping hole, a pressure relief hole, and an exhaust hole, the pumping hole and the pressure relief hole both are configured to communicate with the closed receiving cavity, an air inlet of the pumping power element is configured to communicate with the closed receiving cavity, and the pumping hole is configured to communicate with the pumping opening after the vacuum pumping device is mounted on the cup cover; and the pumping hole, the closed receiving cavity, and the pressure relief hole are configured to communicate with each other to form a pressure relief air path, and the pumping hole, the closed receiving cavity, the pumping power element, and the exhaust hole are configured to communicate with each other to form a pumping air path.

15. The food processor of claim 1, wherein the vacuum pumping device is detachably connected to the cup cover through a clamping structure, a screw structure or a magnetic suction structure.

16. The food processor of claim 1, wherein a mounting detection structure for detecting whether the vacuum pumping device is mounted on the cup cover is provided between the cup cover and the vacuum pumping device.

17. The food processor of claim 2, wherein the waterproof and breathable structure comprises a waterproof and breathable membrane.

18. The food processor of claim 1, wherein a receiving cavity is formed on the housing, the pumping power element is received in the receiving cavity; and the vacuum pumping device further comprises a control circuit board and a start switch mounted on the housing, and the control circuit board is configured to receive start signal of the start switch and control the pumping power element to start.

19. The food processor of claim 18, wherein the food processor further comprises a detection module, the detection module is received in the receiving cavity and connected to the control circuit board and the pumping power element, and the detection module is configured to detect a current, a suction pressure, or a running time of the pumping power element.

20. The food processor of claim 1, wherein the food processor is a wall-breaking machine, a blender, or a juicer.

21. The food processor of claim 1, wherein an air inlet of the pumping power element communicates with the pumping hole through a first pipeline, an air outlet of the pumping power element communicates with the exhaust hole through a second pipeline, and the first pipeline is shorter than the second pipeline.

* * * * *